(12) United States Patent
Yamakawa

(10) Patent No.: US 7,280,289 B2
(45) Date of Patent: Oct. 9, 2007

(54) WIDE ANGLE IMAGING LENS

(75) Inventor: Hiromitsu Yamakawa, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/356,239

(22) Filed: Feb. 17, 2006

(65) Prior Publication Data
US 2006/0187557 A1     Aug. 24, 2006

(30) Foreign Application Priority Data
Feb. 21, 2005    (JP)    ......................... P.2005-044472
Feb. 10, 2006    (JP)    ......................... P.2006-033797

(51) Int. Cl.
    *G02B 13/04*       (2006.01)
    *G02B 9/34*        (2006.01)
    *G02B 13/18*       (2006.01)
    *G02B 3/02*        (2006.01)

(52) U.S. Cl. ........................ 359/771; 359/753; 359/715

(58) Field of Classification Search ................ 359/686, 359/715, 771, 781, 740, 753
See application file for complete search history.

(56) References Cited

FOREIGN PATENT DOCUMENTS

| JP | 2003-232998 A | 8/2003 |
|---|---|---|
| JP | 2003-307674 A | 10/2003 |
| JP | 2005-227426 A | 8/2005 |

*Primary Examiner*—Alicia M Harrington
(74) *Attorney, Agent, or Firm*—Birch, Stewart, Kolasch & Birch, LLP

(57) ABSTRACT

A wide angle imaging lens is provided and includes, in order from an object side, four lenses of a first lens of a negative meniscus lens having a convex surface on the object side, a negative second lens having a concave surface on an image side and constituting at least one of both surfaces by an aspherical surface, a positive third lens having a convex surface on the object side and constituting at least one of both surfaces by an aspherical surface, and a fourth lens having a convex surface on the image side and constituting at least one of both surfaces by an aspherical surface. Further, Abbe numbers of the respective first to fourth lenses with respect to d line are respectively set to be equal to or larger than 40, equal to or larger than 50, equal to or smaller than 40 and equal to or larger than 50, and an aperture diaphragm is arranged between the third lens and the fourth lens.

15 Claims, 25 Drawing Sheets

FIG. 3
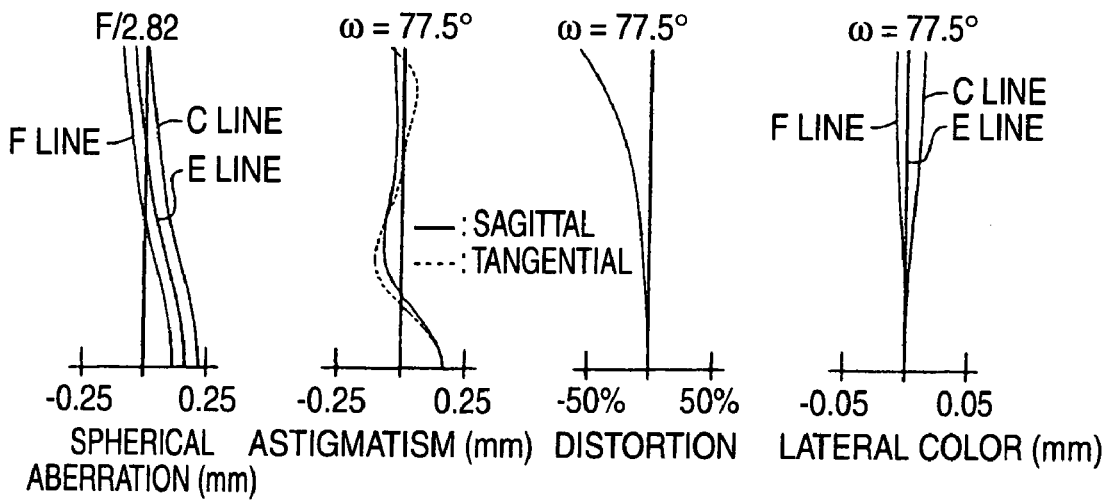
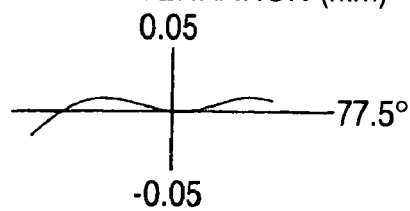
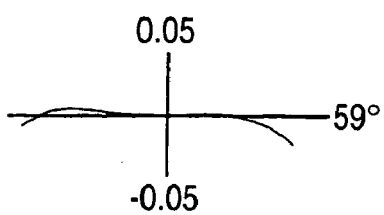
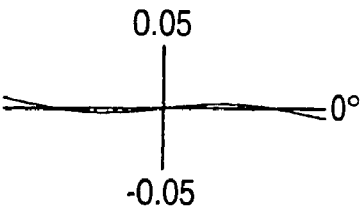

FIG. 5
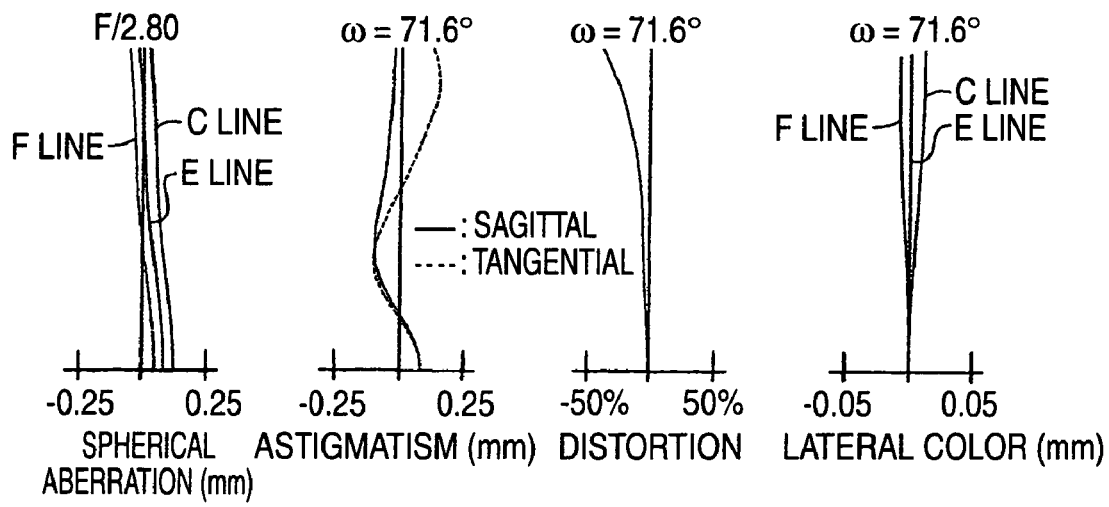
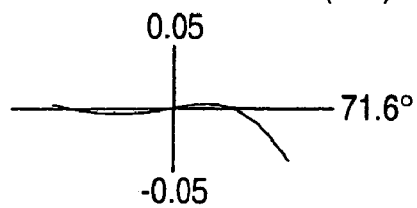
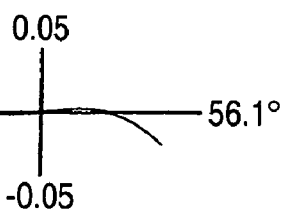
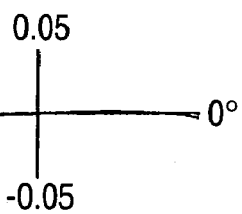

FIG. 7
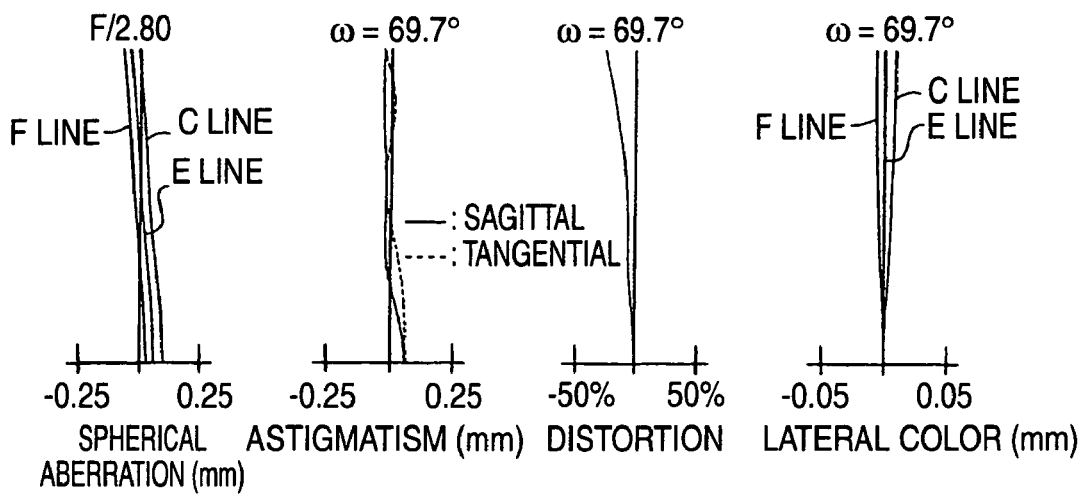
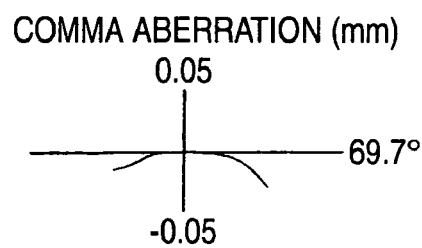
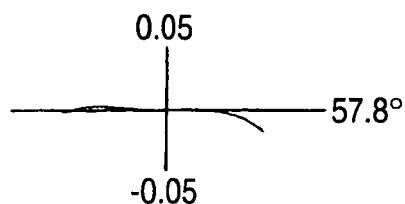

FIG. 9
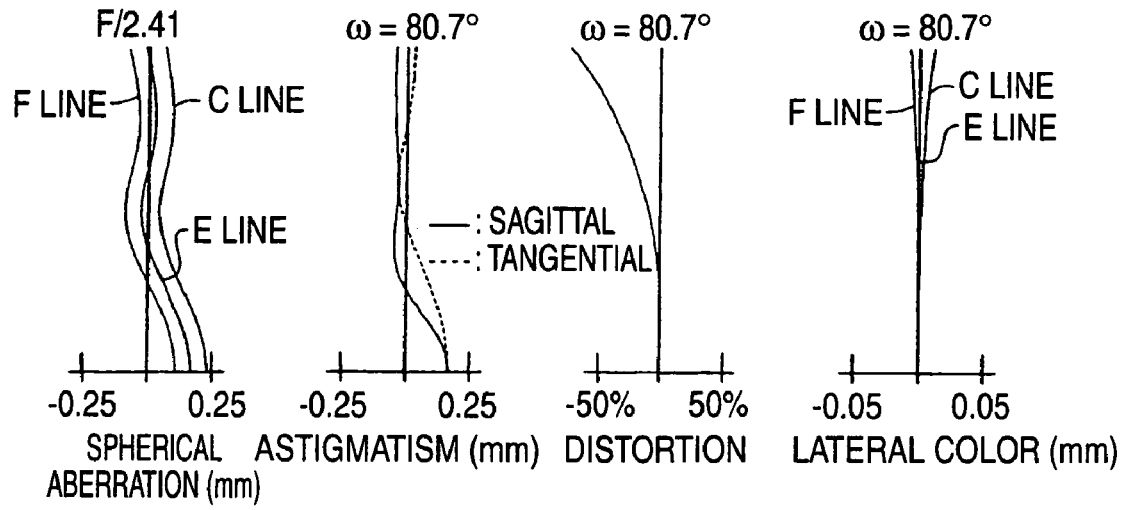
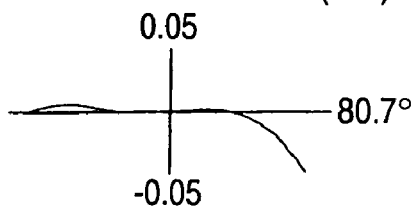
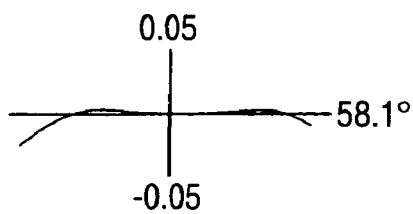
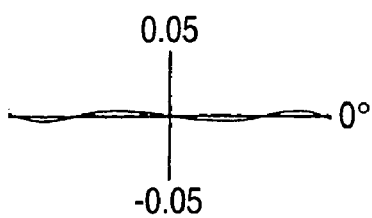

FIG. 11
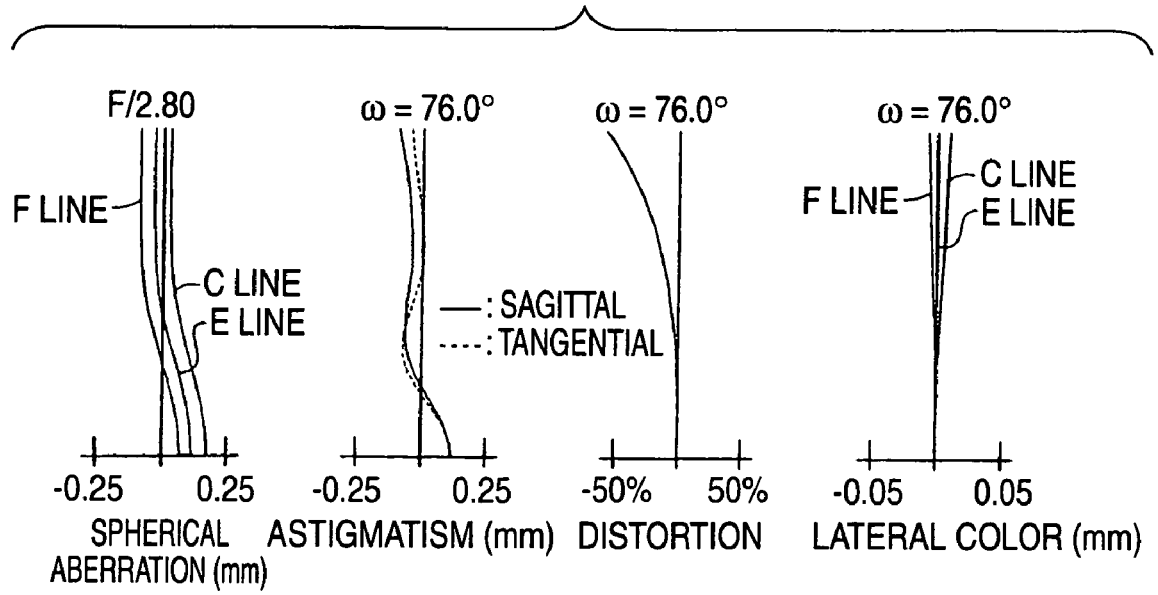
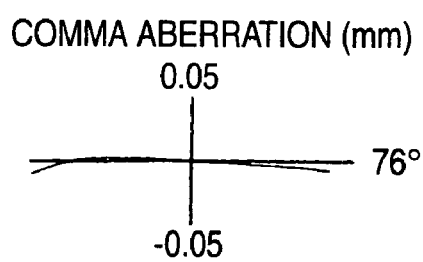
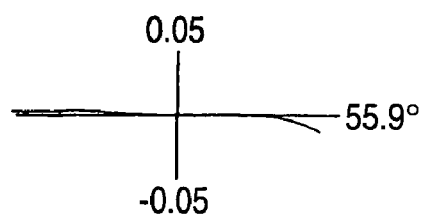
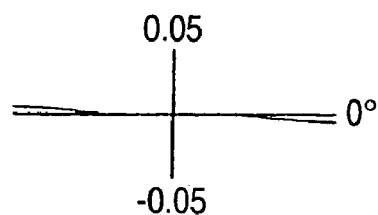

FIG. 13
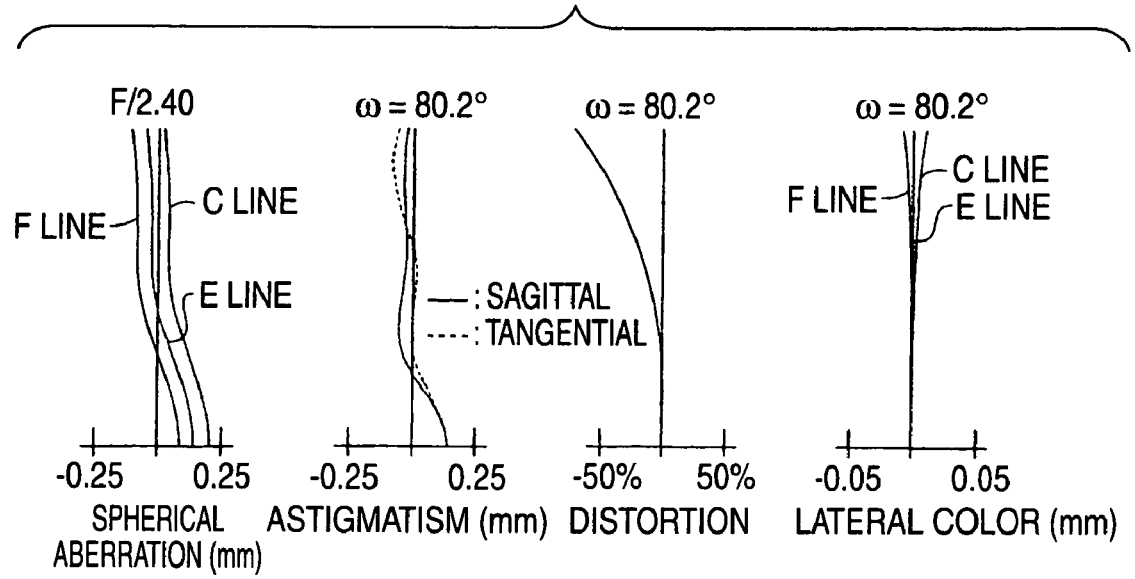
COMMA ABERRATION (mm)
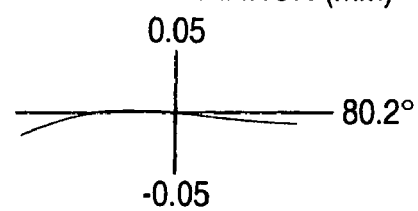
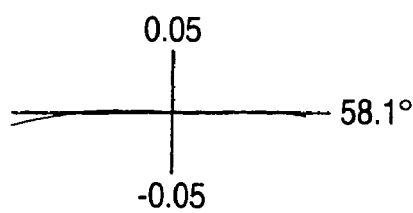
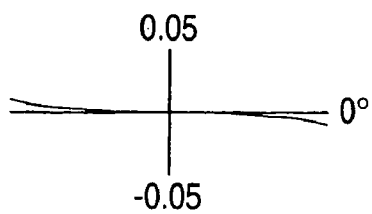

FIG. 15
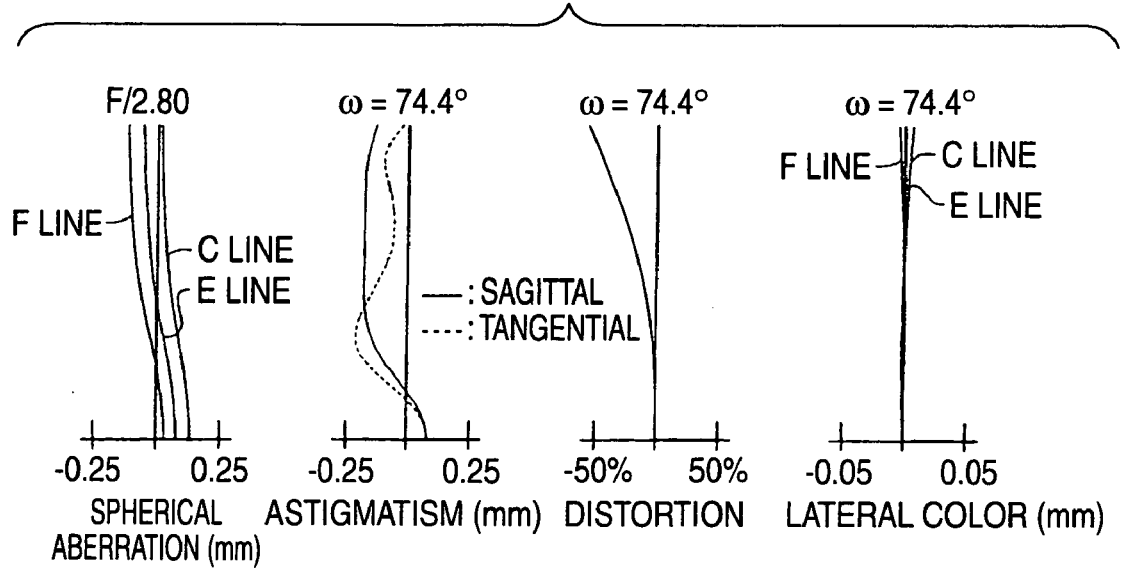
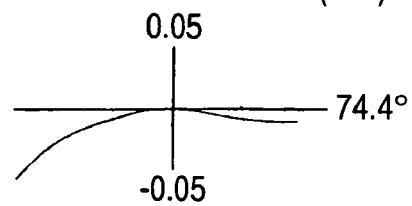
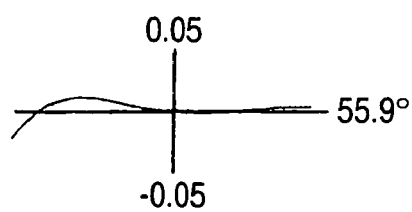
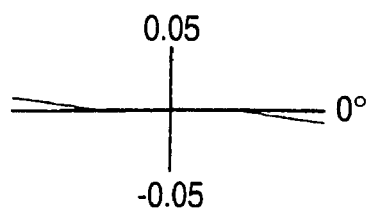

FIG. 17
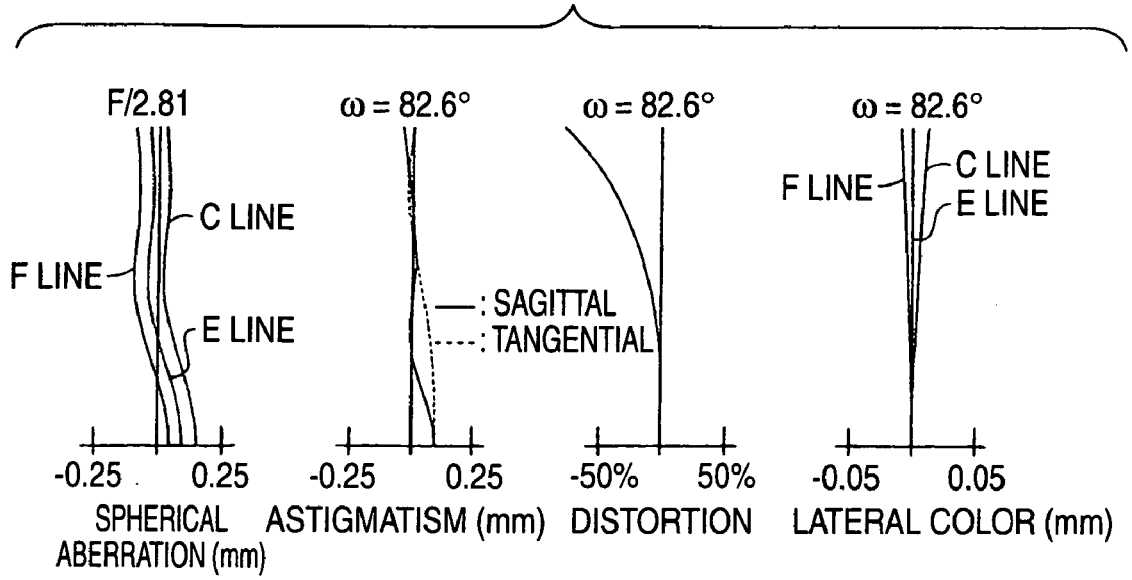
COMMA ABERRATION (mm)
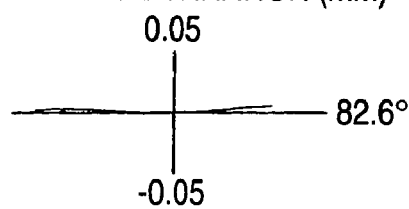
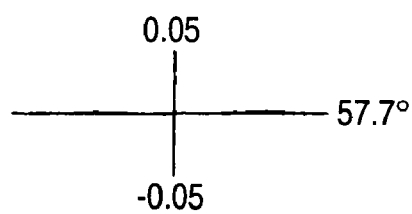
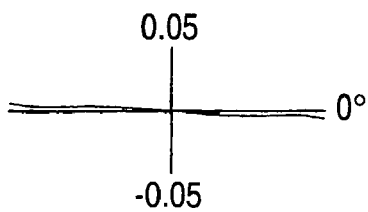

FIG. 19
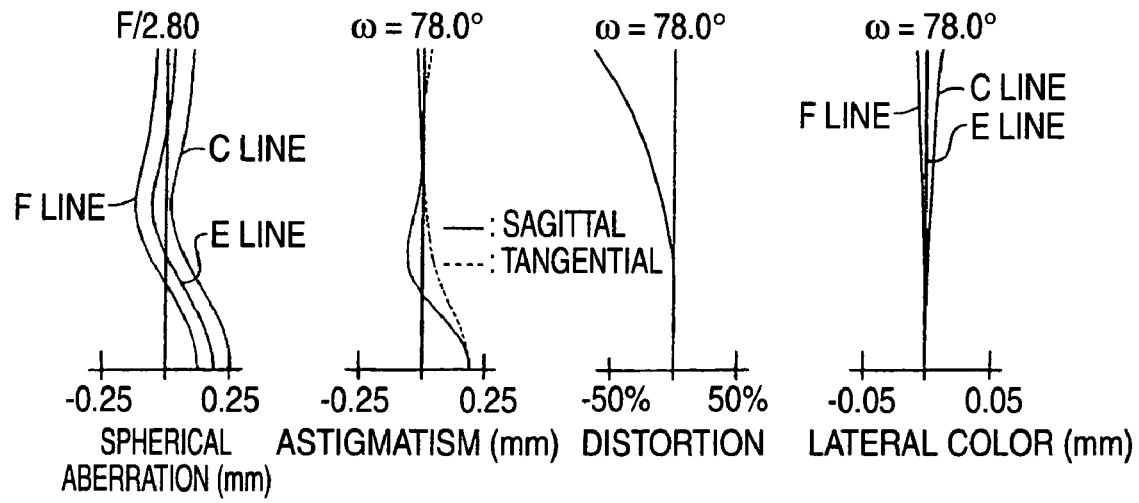
COMMA ABERRATION (mm)
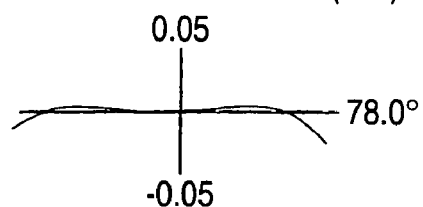
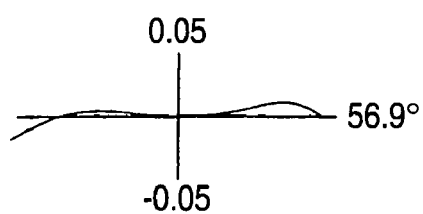
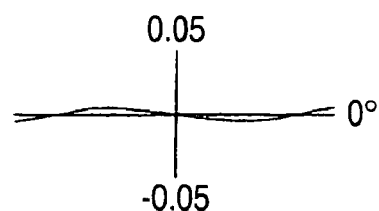

FIG. 21
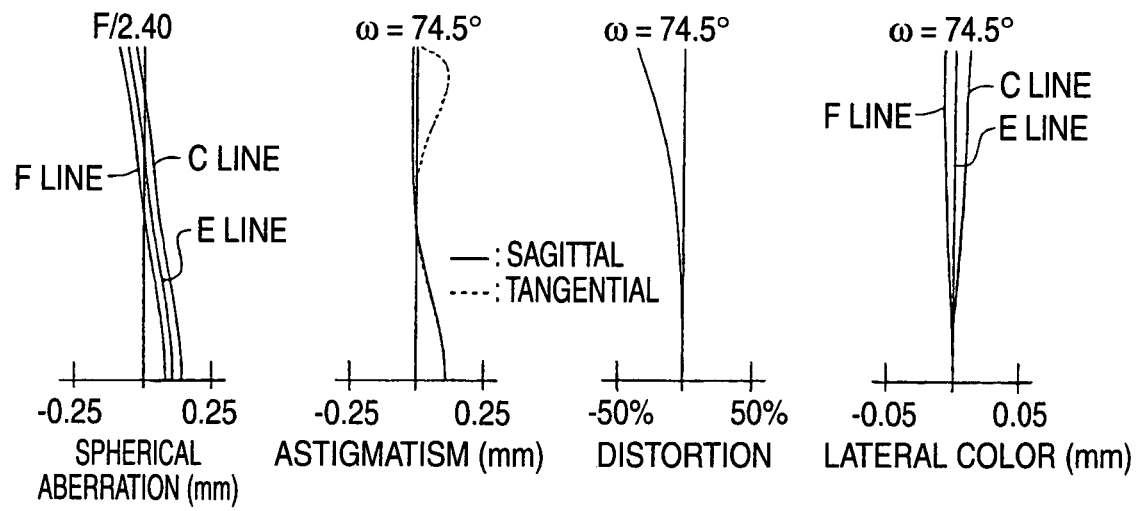
COMMA ABERRATION (mm)
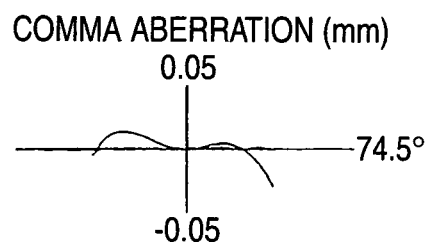
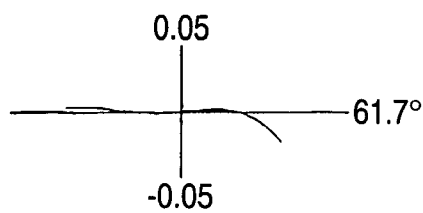
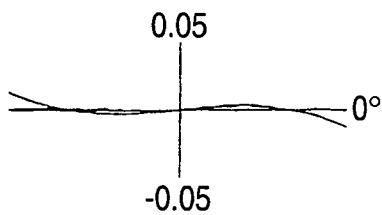

FIG. 23
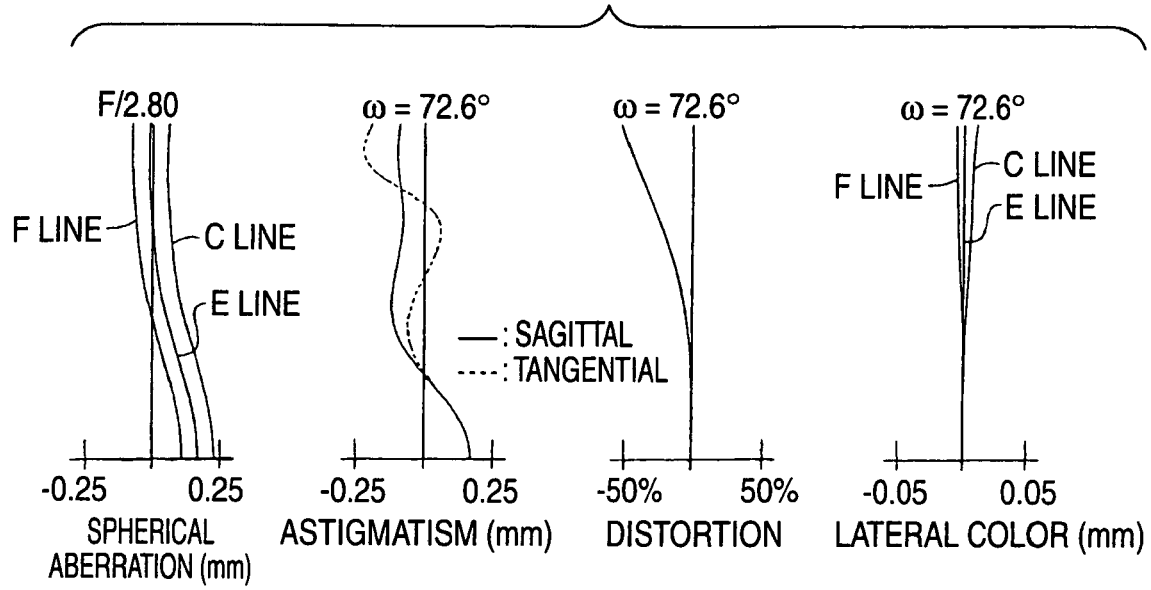
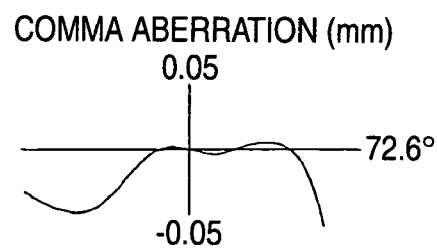
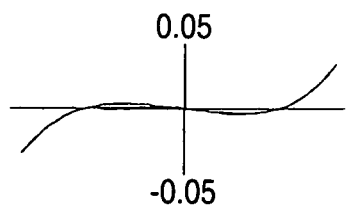
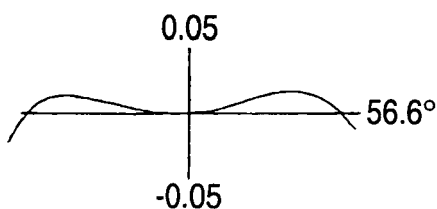
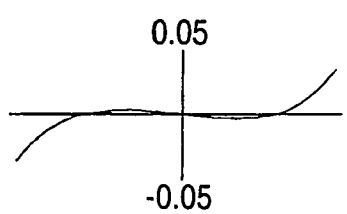
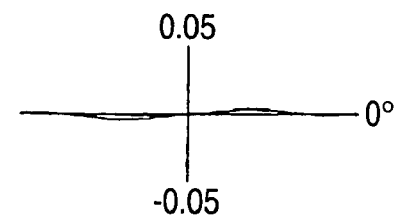

FIG. 25
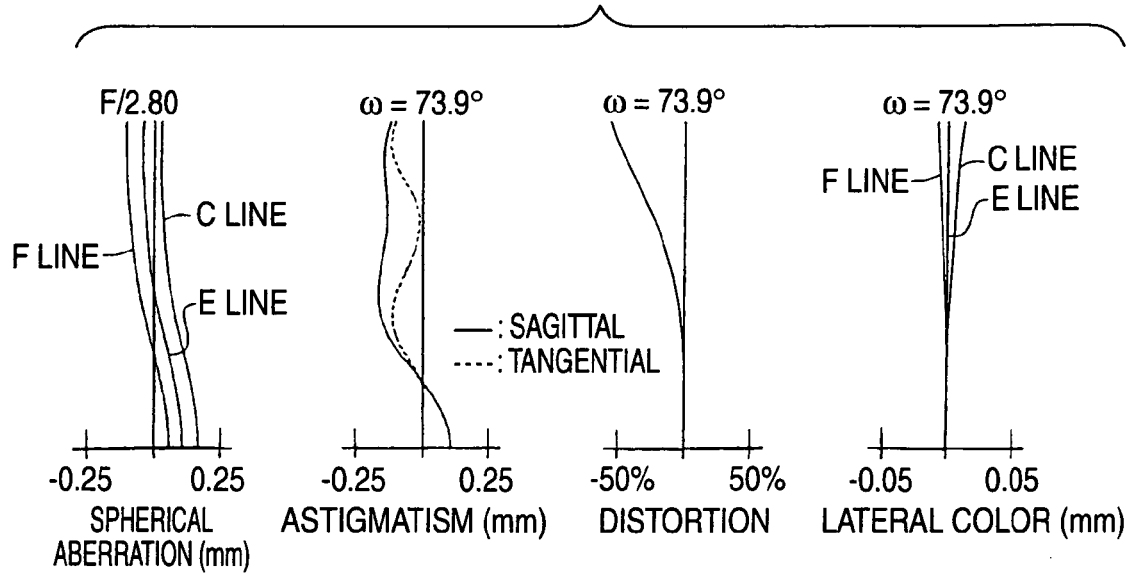
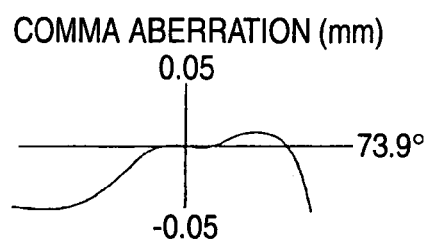
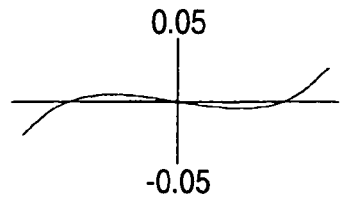
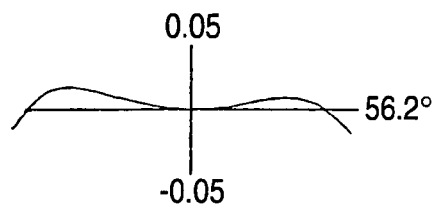
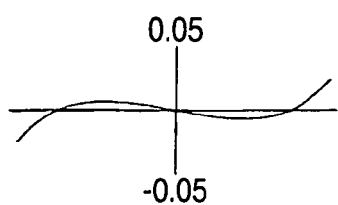
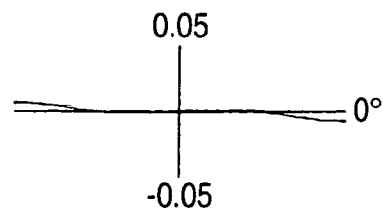

WIDE ANGLE IMAGING LENS

FIELD OF THE INVENTION

The present invention relates to a wide angle lens used in a camera for monitoring, a camera for a portable telephone or the like having an image capturing element of CCD, CMOS or the like, particularly relates to a wide angle imaging lens preferably applied to a vehicle mounted camera for taking an image in a front direction, a side direction, a rear direction or the like of an automobile.

BACKGROUND OF THE INVENTION

According to an imaging lens used in a vehicle mounted camera, it is requested that a focusing aberration characteristic of a total of an effective screen is excellent although the lens is of a wide angle in order to ensure an excellent field of view over a wide range and small-sized and light-weighted since a space of mounting the camera in the vehicle is limited.

In a background art, there is known such a wide angle imaging lens described in, for example, JP-A-2003-307674 and JP-A-2003-232998.

In recent years, particularly in- a wide angle imaging lens mounted to a vehicle mounted camera, it is requested to achieve further small-sized formation, light-weighted formation while maintaining an excellent optical function.

However, according to the wide angle imaging lens described in JP-A-2003-307674 and JP-A-2003-232998, although brightness can be ensured, since the lens is mainly constituted by glass spherical lenses and a number of lenses is as large as 5 through 6, there poses a problem that it is difficult to meet the request in view of a size and a weight thereof.

Further, although there is also known a wide angle imaging lens achieving small-sized formation, light-weighted formation by reducing a number of constituent lenses by using aspherical lenses, heretofore, according to a constitution using the aspherical lenses, it is indicated that an optical function is not sufficient and particularly, lateral color is not corrected sufficiently and there is a concern of bringing about spread of color (refer to JP-A-2003-232998).

A fish eye wide angle lens including four lens elements is disclosed in JP-A-2005-227426 published on Aug. 25, 2005.

SUMMARY OF THE INVENTION

An object of an illustrative, non-limiting embodiment of the invention is to provide a wide angle imaging lens having an excellent optical function, particularly capable of excellently correcting lateral color while achieving further small-sized formation, light-weighted formation.

A wide angle imaging lens of an illustrative, non-limiting embodiment of the invention includes four lenses including an aspheric lens, in which Abbe numbers of materials of a first, a second and a fourth lens are set to be large, Abbe number of a material of a third lens is set to be small, and an aperture diaphragm is arranged between the third lens and the fourth lens.

That is, a wide angle imaging lens according to an illustrative, non-limiting embodiment of the invention is characterized in including, in order from an object side, four lenses of: a first lens of a meniscus lens having a negative refractive power and having a convex surface on the object side; a second lens having a negative refractive power and having a concave surface on an image side, at lease one of both surfaces of the second lens being aspheric (an aspherical surface); a third lens having a positive refractive power and having a convex surface on the object side, at least one of both surfaces of the third lens being aspheric; a fourth lens having a positive refractive power and having a convex surface on the image side, at least one of both surfaces of the fourth lens being aspheric, in which the first lens comprises a material having Abbe number at d line of 40 or more, the second lens comprises a material having Abbe number at d line of 50 or more, the third lens comprises a material having Abbe number at d line of 40 or less, the fourth lens comprises a material having Abbe number at d line of 50 or more, and an aperture diaphragm is arranged between the third lens and the fourth lens.

According to the embodiment, it is preferable that a difference of Abbe number with respect to d line between the material of the second lens and the material of the third lens is set to be equal to or larger than 20, and it is preferable that the both surfaces of the second lens are aspheric, the both surfaces of the third lens are aspheric, and the both surfaces of the fourth lens are aspheric. Further, it is preferable that a surface on the image side of the first lens is formed with an antireflection coat having an optical thickness of 150 nm to 225 nm at a vicinity of an optical axis.

Further, it is preferable that when a difference between a coordinate in an optical axis direction of an apex of a surface on the object side of the third lens (i.e., a first coordinate) and a coordinate in the optical axis direction of an intersection of an off-axis outermost light, which passes at an outermost edge of an effective diameter of the wide angle imaging lens, with the surface on the object side (i.e., a second coordinate) is designated by Z5, and a difference between a coordinate in the optical axis direction of an apex of a surface on the image side of the third lens (i.e., a third coordinate) and a coordinate in the optical axis direction of an intersection of the off-axis outermost light with a surface on the image side (i.e., a fourth coordinate) is designated by Z6, Condition Equation (1), shown below, is satisfied.

$$|Z5/Z6|>3 \quad (1)$$

Further, it is preferable that when a distance from a surface on the object side of the first lens to a imaging surface is designated by L, and a distance from a surface on the image side of the fourth lens to the imaging surface is designated by d8, Condition Equation (2), shown below, is satisfied, provided that, when other optical member is interposed in an optical path, d8, L are set to distances calculated by converting an optical thickness in the optical axis direction of the other optical member by an optical thickness of air.

$$0.25>d8/L>0.13 \quad (2)$$

Further, it is preferable to form the second lens, the third lens and the fourth lens by a material having a water absorption equal to or smaller than 0.3%, particularly, a plastic material.

As a preferable optical material satisfying the above-described various requirements, a resin of polyolefin species can be pointed out as the material of the second lens and the fourth lens and a resin of polycarbonate species can be pointed out as the material of the third lens.

Further, it is preferable that the wide angle imaging lens satisfies Condition Equation (4):

$$0.10 < f/D < 0.22 \quad (4)$$

wherein f represents a focal length of the entire system of the wide angle imaging lens, and D represents a distance from a surface on the object side of the first lens to a surface on the image side of the fourth lens.

Further, it is preferable that the wide angle imaging lens satisfies Condition Equations (5) and (6):

$$-0.9 < f/f_2 < -0.4 \quad (5)$$

$$0.3 < f/f_3 < 0.8 \quad (6)$$

wherein $f_2$ represents a focal length of the second lens, and $f_3$ represents a focal length of the third lens.

The "optical thickness" in the specification means a product of n and t, in which n represents a refractive index at d line of the material for the coat, and t represents a physical thickness of the coat.

A wide angle imaging lens according to the invention includes four lenses and therefore, further small-sized formation, light-weighted formation can be achieved. Further, by constituting shapes of surfaces of the respective lenses as described above, setting Abbe numbers of the respective materials of the first, the second and fourth lens to be large and setting Abbe number of the material of the third lens to be small and arranging the aperture diaphragm between the third lens and the fourth lens, an excellent optical function can be maintained, particularly, lateral color can excellently be corrected.

BRIEF DESCRIPTION OF THE DRAWINGS

FIG. 3 illustrates aberration diagrams showing various aberrations (spherical aberration, astigmatism, distortion, lateral color, comma aberration) of the wide angle imaging lens according to Example 1.

FIG. 5 illustrates aberration diagrams showing various aberrations (spherical aberration, astigmatism, distortion, lateral color, comma aberration) of the wide angle imaging lens according to Example 2.

FIG. 7 illustrates aberration diagrams showing various aberrations (spherical aberration, astigmatism, distortion, lateral color, comma aberration) of the wide angle imaging lens according to Example 3.

FIG. 9 illustrates aberration diagrams showing various aberrations (spherical aberration, astigmatism, distortion, lateral color, comma aberration) of the wide angle imaging lens according to Example 4.

FIG. 11 illustrates aberration diagrams showing various aberrations (spherical aberration, astigmatism, distortion, lateral color, comma aberration) of the wide angle imaging lens according to Example 5.

FIG. 13 illustrates aberration diagrams showing various aberrations (spherical aberration, astigmatism, distortion, lateral color, comma aberration) of the wide angle imaging lens according to Example 6.

FIG. 15 illustrates aberration diagrams showing various aberrations (spherical aberration, astigmatism, distortion, lateral color, comma aberration) of the wide angle imaging lens according to Example 7.

FIG. 17 illustrates aberration diagrams showing various aberrations (spherical aberration, astigmatism, distortion, lateral color, comma aberration) of the wide angle imaging lens according to Example 8.

FIG. 19 illustrates aberration diagrams showing various aberrations (spherical aberration, astigmatism, distortion, lateral color, comma aberration) of the wide angle imaging lens according to Example 9.

FIG. 21 illustrates aberration diagrams showing various aberrations (spherical aberration, astigmatism, distortion, lateral color, comma aberration) of the wide angle imaging lens according to Example 10.

FIG. 23 illustrates aberration diagrams showing various aberrations (spherical aberration, astigmatism, distortion, lateral color, comma aberration) of the wide angle imaging lens according to Example 11.

FIG. 25 illustrates aberration diagrams showing various aberrations (spherical aberration, astigmatism, distortion, lateral color, comma aberration) of the wide angle imaging lens according to Example 12.

DETAILED DESCRIPTION OF THE INVENTION

An exemplary embodiment of the invention will be explained in details in reference to the drawings as follows.

Figure 1:
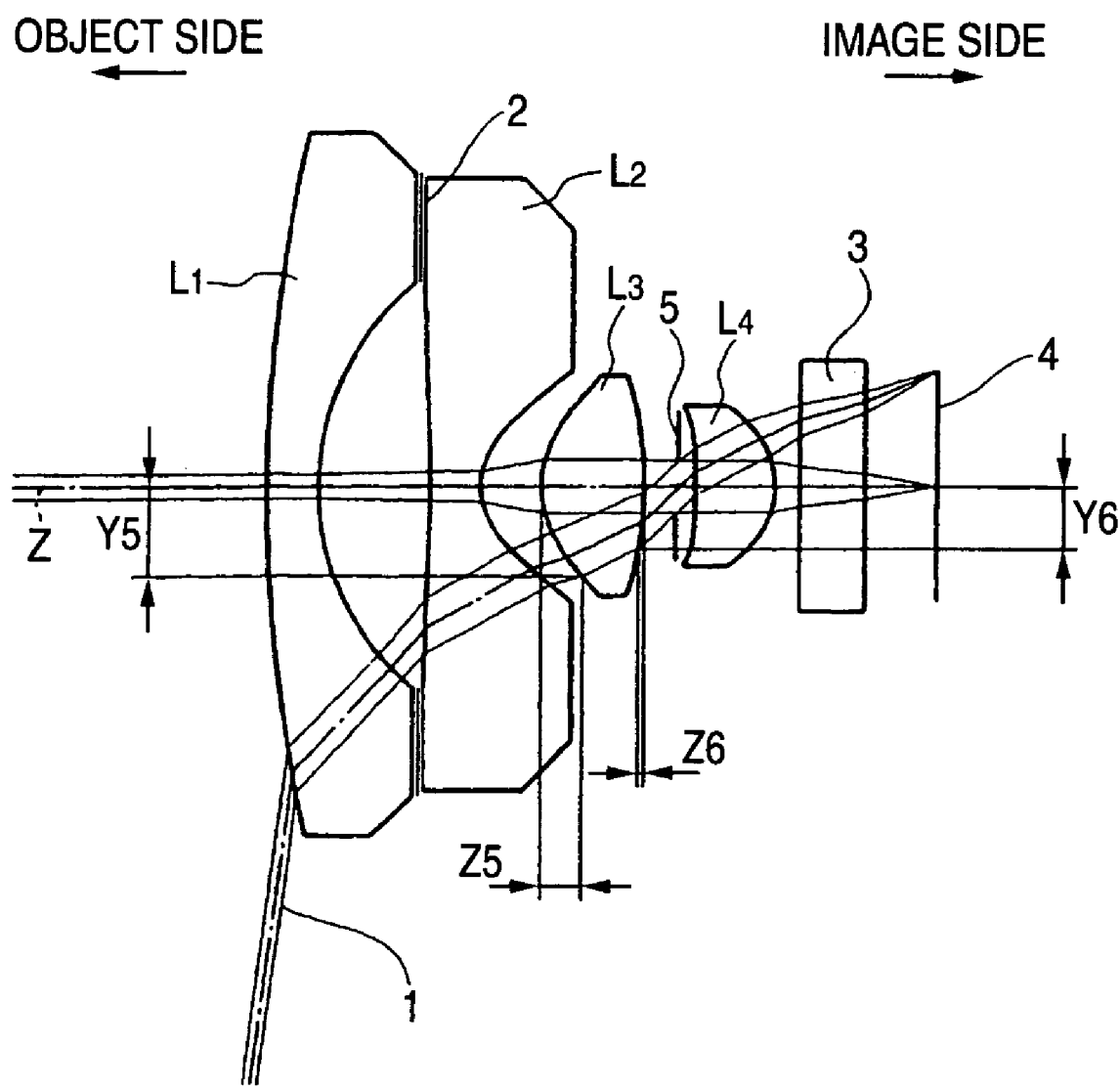
FIG. 1 is a view showing a constitution of a wide angle imaging lens according to an exemplary embodiment of the invention.

FIG. 1 is a view showing a constitution of a wide angle imaging lens according to an exemplary embodiment of the invention. The illustrated wide angle imaging lens of the embodiment is preferably applied to a vehicle mounted camera for taking an image in a front direction, a side direction, a rear direction or the like of an automobile and is constituted by arranging: in order from the object side, four lenses of a first lens $L_1$ of a meniscus lens having a convex surface on the object side and having a negative refracting power; a second lens $L_2$ having a concave surface on an image side, constituting at least one of both surfaces by an aspherical surface and having a negative refracting power; a third lens $L_3$ having a convex surface on the object side, constituting at least one of both surfaces by an aspherical surface and having a positive refracting power; and a fourth lens $L_4$ having a positive refractive power and having a convex surface on the image side and constituting at least one of both surfaces by an aspherical surface.

Further, Abbe number (with respect to d line. The same as follows) of a material constituting the first lens $L_1$ is set to be equal to or larger than 40, Abbe number of a material constituting the second lens $L_2$ is set to be equal to or larger than 50, Abbe number of a material constituting the third lens $L_3$ is set to be equal to or smaller than 40, Abbe number of a material constituting the fourth lens $L_4$ is set to be equal to or larger than 50, respectively, and an aperture diaphragm 5 is arranged between the third lens $L_3$ and the fourth lens $L_4$.

According to the wide angle imaging lens of the embodiment, preferably, a difference between Abbe number of the material constituting the second lens $L_2$ and Abbe number of the material constituting the third lens $L_3$ is set to be equal to or larger than 20, further, the respective both surfaces of the second lens $L_2$, the third lens $L_3$ and the fourth lens $L_4$ are constituted by aspherical surfaces.

Further, preferably, a surface of the image side of the first lens $L_1$ is formed with a antireflection coat having an optical thickness at a vicinity of an optical axis Z equal to or larger than 150 nm and equal to or smaller than 225 nm.

Further, according to the wide angle imaging lens of the embodiment, preferably, it is constituted to satisfy Condition Equations (1), (2) for resolving the problems.

$$|Z5/Z6|>3 \qquad (1)$$

$$0.25>d8/L>0.13 \qquad (2)$$

Further, as shown by FIG. 1, Z5 indicates a difference between a coordinate in an optical axis direction of an apex of a surface of the object side of the third lens $L_3$ (a coordinate in a coordinate axis when the coordinate axis is set on the optical axis Z) and a coordinate in the optical axis direction of an intersection of an off-axis outermost light 1, which passes at an outermost edge of an effective diameter of the wide angle imaging lens (½ of the effective diameter of the surface on the object side of the third lens $L_3$ is indicated by Y5, ½ of an effective diameter of the surface on the image side is indicated by Y6), with the surface on the object side. Similarly, Z6 indicates a difference between a coordinate in the optical axis direction of an apex of a surface on the image side of the third lens $L_3$ and a coordinate in the optical axis direction of an intersection of the outermost light 1 with the surface on the image side.

Further, according to the wide angle imaging lens of the embodiment, preferably, it is constituted to satisfy at least one of Condition Equations (4), (5) and (6):

$$0.10<f/D<0.22 \qquad (4)$$

$$-0.9<f/f_2<-0.4 \qquad (5)$$

$$0.3<f/f_3<0.8 \qquad (6)$$

In the Condition Equations, f represents a focal length of the entire system of the wide angle imaging lens, D represents a distance from a surface on the object side of the first lens to a surface on the image side of the fourth lens, $f_2$ represents a focal length of the second lens, and $f_3$ represents a focal length of the third lens.

Figure 2:
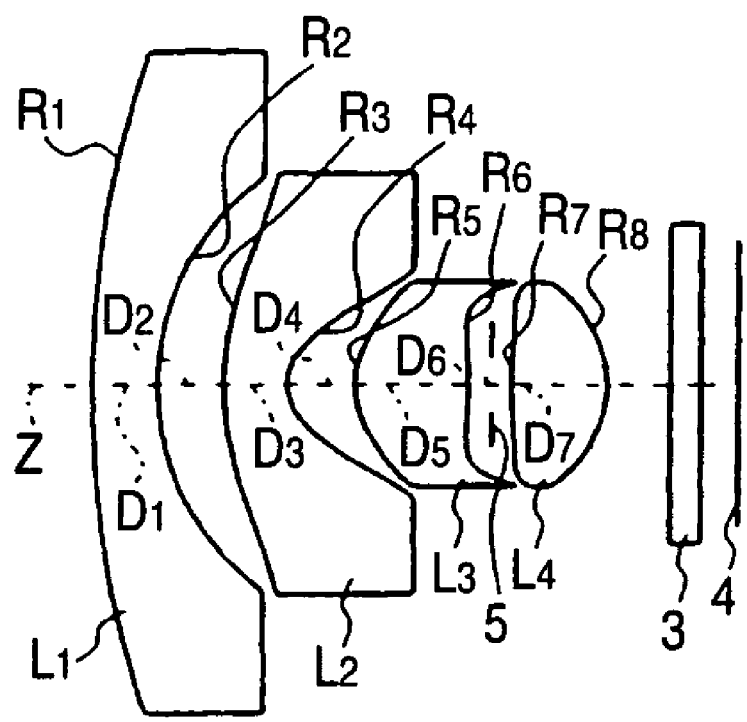
FIG. 2 is a view showing a constitution of a wide angle imaging lens according to Example 1.

Further, as shown by FIG. 2, L indicates a distance on the optical axis Z from the surface on the object side of the first lens $L_1$ to a imaging surface 4 (which substantially coincides with a light receiving surface of an imaging element), d8 indicates a distance on the optical axis Z from a surface on the image side of the fourth lens $L_4$ to the imaging surface 4. However, when other optical member 3 (a cover glass (including various filters) of the imaging element or the like is interposed in an optical path, d8, L are set to distances calculated by converting an optical thickness in the optical axis Z direction of the other optical member 3 by that of air.

Further, preferably, the second lens $L_2$ and the fourth lens $L_4$ are formed by a material having a water absorption equal to or smaller than 0.3% (for example, a plastic material of polyolefin species having a water absorption equal to or smaller than 0.01%) and the third lens $L_3$ is formed by a material having a water absorption equal to or smaller than 0.3% (for example, a plastic material of polycarbonate species having a water absorption equal to or smaller than 0.2%).

Further, preferably, a light shielding member 2 is provided out of a region of an effective diameter of the surface on the image side of the first lens $L_1$ (refer to FIG. 1). The light shielding member 2 is constituted by, for example, an opaque plate member or an opaque coating or the like.

An explanation will be given the meaning of constituting the lenses in this way as follows.

First, with regard to a relationship between Abbe numbers of materials constituting the respective lenses and a position of arranging the aperture diaphragm 5, since the first lens $L_1$ and the second lens $L_2$ constituting negative lenses are disposed on the object side relative to the aperture diaphragm 5, the larger the Abbe numbers of the respective materials constituting the negative lenses, the smaller the lateral colors brought about at the first lens $L_1$ and the second lens $L_2$. However, no matter how Abbe numbers of the respective materials constituting the first lens $L_1$ and the second lens $L_2$ are increased, the lateral colors brought about at the first lens $L_1$ and the second lens $L_2$ do not become null. Hence, the lateral colors are corrected by the third lens $L_3$ constituting the positive lens, since the third lens $L_3$ is disposed on the object side relative to the aperture diaphragm 5, the smaller the Abbe number of the material constituting the third lens $L_3$, the more effective is the correction. Further, when Abbe number of the material constituting the third lens $L_3$ is excessively small, the correction becomes excessive and therefore, it is preferable that a difference between Abbe number of the material constituting the second lens $L_2$ and Abbe number of the material constituting the third lens $L_3$ is equal to or smaller than 40.

On the other hand, the larger the Abbe numbers of the respective materials constituting the first lens $L_1$ and the second lens $L_2$ constituting the negative lenses, and the smaller the Abbe number of the material constituting the third lens $L_3$ constituting the positive lens, the larger the on axis chromatic aberration. However, according to a lens having a small focal length such as the wide angle imaging lens according to the invention, an influence of the on axis chromatic aberration effected on an image quality is small and it is more important to correct the lateral color causing a color shift of an image and therefore, Abbe numbers of the respective materials constituting the respective lenses are set as described above. Further, when a difference between Abbe number of the material constituting the second lens $L_2$ and Abbe number of the material constituting the third lens $L_3$ is set to be equal to or larger than 20, an effect of correcting the lateral color becomes significant.

Further, when the aperture diaphragm 5 is installed between the second lens $L_2$ and the third lens $L_3$, no matter how Abbe number of the material constituting the third lens $L_3$ is set, the lateral color is brought about in a direction the same as a direction for bringing about the lateral color by the first lens $L_1$ and the second lens $L_2$ and therefore, the lateral color brought about by the first lens $L_1$ and the second lens $L_2$ cannot be corrected and the lateral color is further increased.

On the other hand, when the aperture diaphragm 5 is installed on the image side of the fourth lens $L_4$, a distance of a light flux passing the surfaces of the respective lenses from the optical axis Z is increased and therefore, it is difficult to correct various aberrations, the lens system becomes large-sized, which becomes disadvantageous for small-sized and light-weighted formation and low cost formation. Further, also when the aperture diaphragm 5 is installed on the object side of the first lens $L_1$, or between the first lens $L_1$ and the second lens $L_2$, it is similarly difficult to correct various aberrations.

In consideration thereof, the aperture diaphragm 5 is installed between the third lens $L_3$ and the fourth lens $L_4$, thereby, excellent correction of the lateral color and small-sized formation, light-weighted formation and low cost formation of the lens system can be achieved.

Further, when respective both surfaces of the second lens $L_2$, the third lens $L_3$ and the fourth lens $L_4$ are constituted by aspherical surfaces, a total length of the lens system can further be shortened and excellent resolution is achieved.

Further, when the second lens $L_2$, the third lens $L_3$ and the fourth lens $L_4$ are constituted by plastic lenses, aspherical shapes can highly accurately be realized and further light-weighted formation and low cost formation can be achieved.

Further, when the second lens $L_2$, the third lens $L_3$ and the fourth lens $L_4$ are formed by a material having an extremely small water absorption, a deterioration in the function by absorbing water can be minimized.

Further, in the wide angle imaging lens according to the invention, a radius of curvature of the surface on the image side of the first lens $L_1$ is small and therefore, the optical thickness of the antireflection coat at a peripheral portion tends to be smaller than that at a center portion. Therefore, by forming the antireflection coat having the optical thickness at the portion proximate to the optical axis Z to be equal to or larger than 150 nm and equal to or smaller than 225 nm at the surface on the image side of the first lens $L_1$, a reflectivity can be reduced on an average of a total in the effective diameter region, thereby, ghost light can be reduced.

Further, when the optical thickness of the antireflection coat at the vicinity of the optical axis is smaller than 150 nm, the optical thickness at the peripheral portion becomes excessively small, the reflectivity on a side of a long wavelength is increased and therefore, reddish ghost is liable to be brought about. In contrast thereto, when the optical thickness of the antireflection coat at the vicinity of the optical axis is larger than 225 nm, the optical thickness at the center portion becomes excessively large, the reflectivity on a side of a short wavelength is increased and therefore, color of the image becomes excessively red and bluish ghost is liable to be brought about.

Further, when Condition Equation (1) is satisfied, a deterioration in the resolution when the both surfaces of the third lens $L_3$ are shifted in a direction orthogonal to the optical axis Z relatively is decreased and therefore, a high part accuracy is not requested for the third lens $L_3$.

Further, in Condition Equation (2), when d8/L is below the upper limit, it is possible to excellently correct various aberrations and the requested optical function can be achieved.

On the other hand, when d8/L becomes larger than the lower limit, various aberrations can excellently be corrected and the lens system becomes easy to be arranged and it is possible to constitute small-sized formation.

Further, when any one of the Condition Equations (4), (5) and (6) is satisfied, it is possible to reduce cost of manufacturing, to achieve further small-sized formation, light-weighted formation and to ensure appropriate distances between the lenses. The wide angle imaging lens satisfying the Condition Equation (4) preferably satisfies the Condition Equation (4') for achieving the above effect.

$$0.13 < f/D < 0.20 \qquad (4')$$

When f/D is below the upper limit in the Condition Equation (4), it is possible to appropriately arrange lenses having a suitable shape without the lenses' accessing too close to each other, and to shield stray light. When f/D becomes larger than the lower limit in the Condition Equation (4), it is possible to prevent the angle of view from increasing. That is, it is possible to prevent the size in radial direction of the first lens $L_1$ from extremely increasing, to thereby reduce cost of manufacturing.

When $f/f_2$ is below the upper limit in the Condition Equation (5), the wide angle imaging lens has a negative power enough to obtain a desirable angle of view, and the fist lens has such a negative power and radius of curvature on the side of the second lens $L_2$ that the fist lens can be easy to be manufactured. Further, the third lens $L_3$ has such a positive power that the lateral color can be reduced. When $f/f_2$ becomes larger than the lower limit in the Condition Equation (5), the lateral color can be corrected well and the second lens has such a power to be easily manufactured. Further, since position errors of the second lens $L_2$ and the third lens $L_3$ do not affect aberration of the wide angle imaging lens, it is not necessary to set the positions of the second lens $L_2$ and the third lens $L_3$ with high accuracy.

When $f/f_3$ is below the upper limit in the Condition Equation (6), the lateral color can be corrected well and the second lens has such a negative power to be easily manufactured. Further, since position errors of the second lens $L_2$ and the third lens $L_3$ do not affect aberration of the wide angle imaging lens, it is not necessary to set the positions of the second lens $L_2$ and the third lens $L_3$ with high accuracy. When $f/f_3$ becomes larger than the lower limit in the Condition Equation (6), the lateral color can be corrected well.

Further, although a light flux passing outside of the effective diameter between the first lens $L_1$ and the second lens $L_2$ becomes stray light to reach the imaging surface to cause ghost, by providing the light shielding means 2 outside of the effective diameter region of the first lens $L_1$ on the side of the second lens $L_2$, such stray light is shielded.

Further, it is preferable that the second lens $L_2$ has a convex on the object side. In such constitution, it is easy to reduce a distortion in the center portion of the image, and the excellent image having a less distortion in the center portion can be obtained. Lenses of the following Examples 1, 2, 3, 5, 10, 11 and 12 have such constitution. Particularly, the lenses of Examples 1, 2, 3, 10, 11 and 12, each of which has an outstanding convex shape and satisfies r3/f<10 (f: a focal length of the entire system, r3: a radius of curvature at the vicinity of the optical axis), has an superior effect on the above.

EXAMPLES

The wide angle imaging lens of the invention will be explained further in details by using specific examples as follows.

Example 1

A constitution of a wide angle imaging lens according to Example 1 is as shown by FIG. 2.

That is, as illustrated, the wide angle imaging lens of Example 1 is constituted by arranging, successively from the object side, 4 elements of lenses of the first lens $L_1$ constituting a negative meniscus lens directing a convex surface to the object side, the second lens $L_2$ constituting a negative meniscus lens directing a concave surface to the image side and constituting both surfaces by aspherical surfaces, the positive third lens $L_3$ directing a convex surface to the object side and constituting both surfaces by aspherical surfaces, and the positive fourth lens $L_4$ directing a convex surface to the image side and constituting both surfaces by aspherical surfaces. Further, the aperture diaphragm 5 is arranged between the third lens $L_3$ and the fourth lens $L_4$ and the other optical member 3 is arranged between the fourth lens $L_4$ and the imaging surface 4.

Specific data are shown with regard to Example 1.

An upper stage of Table 1 shows radii of curvature R of respective lens surfaces of Example 1 (in cases of aspherical surfaces, radii of curvature at positions proximate to the optical axis Z, unit mm), surface intervals on the axis of respective lenses (center optical thicknesses of respective lenses and air intervals between respective lenses) D (mm), refractive indices $N_e$ in e line of respective lenses and Abbe numbers $V_d$ in d line (the same in Table 2 through Table 12). Further, there are shown names of materials constituting respective lenses (S-LAH66 of the first lens $L_1$ indicates a product name of a glass material made by Kabushiki Kaisha Ohara, ZEONEX of the second lens $L_2$ and the fourth lens $L_4$ indicates a registered trade mark of an optical plastic material made by Nihon Zeon Kabushiki Kaisha, PC of the third lens $L_3$ indicates polycarbonate). Further, a left side of a middle stage of Table 1 shows an optical thickness dG (unit mm) and a refractive index NG in e line of the other optical member 3, a focal length f (mm) and an angle of view $2\omega$ (degree) of the total system. Further, a right side of the middle stage of Table 1 shows values in correspondence with Condition Equations (1), (2), (4), (5) and (6) in Embodiment 1.

Further, a lower stage of Table 1 shows respective aspherical coefficients of respective aspherical surfaces of the second lens $L_2$, the third lens $L_3$ and the fourth lens $L_4$ expressed by the following equation (3) (the same in Table 2 through Table 12).

TABLE 1

| Surface | R | D | $N_e$ | $v_d$ | |
|---|---|---|---|---|---|
| 1 | 16.5180 | 1.00 | 1.77621 | 49.6 | S-LAH66 |
| 2 | 4.0021 | 1.04 | | | |
| 3 | 4.3048 | 1.00 | 1.51081 | 56.0 | ZEONEX |
| 4 | 0.6792 | 1.07 | | | |
| 5 | 1.4550 | 1.80 | 1.58820 | 30.3 | PC |
| 6 | −9.2487 | 0.70 | | | |
| 7 | 4.4000 | 1.50 | 1.51081 | 56.0 | ZEONEX |
| 8 | −1.7800 | | | | |
| dG | 0.50 | | Z5 | 0.750 | |
| NG | 1.52 | | Z6 | −0.030 | |
| f | 1.23 | | Z5/Z6 | −25.225 | |
| 2ω | 155° | | d8 | 1.876 | |
| | | | L | 9.986 | |
| | | | d8/L | 0.188 | |

| Aspherical Coefficient | | | | | |
|---|---|---|---|---|---|
| surface No. | | | | | |
| 3 | 4 | 5 | 6 | 7 | 8 |
| K | $4.93106 \times 10^{-1}$ | $3.11250 \times 10^{-2}$ | $3.34960 \times 10^{-1}$ | $9.85617 \times 10^{-1}$ | $-1.85785 \times 10^{-1}$ | $-4.54439$ |
| $A_3$ | $1.33855 \times 10^{-2}$ | $2.12496 \times 10^{-2}$ | $2.84468 \times 10^{-2}$ | $-5.26308 \times 10^{-3}$ | $-2.27911 \times 10^{-2}$ | $-1.32221 \times 10^{-1}$ |

TABLE 1-continued

| | | | | | | |
|---|---|---|---|---|---|---|
| $A_4$ | $-2.55505 \times 10^{-2}$ | $-7.18102 \times 10^{-3}$ | $-4.23538 \times 10^{-4}$ | $1.49422 \times 10^{-3}$ | $-1.12397 \times 10^{-1}$ | $6.73624 \times 10^{-2}$ |
| $A_5$ | $4.21360 \times 10^{-3}$ | $-1.87570 \times 10^{-2}$ | $-2.63954 \times 10^{-2}$ | $-1.67487 \times 10^{-3}$ | $1.00763 \times 10^{-1}$ | $-2.97004 \times 10^{-2}$ |
| $A_6$ | $6.47862 \times 10^{-3}$ | $-2.47936 \times 10^{-3}$ | $-2.16364 \times 10^{-2}$ | $8.79408 \times 10^{-3}$ | $-4.22851 \times 10^{-2}$ | $2.83409 \times 10^{-2}$ |
| $A_7$ | $-3.36051 \times 10^{-3}$ | $-2.27363 \times 10^{-4}$ | $8.99158 \times 10^{-3}$ | $2.65054 \times 10^{-2}$ | $3.32820 \times 10^{-3}$ | $-2.54398 \times 10^{-2}$ |
| $A_8$ | $4.50193 \times 10^{-4}$ | $-9.69888 \times 10^{-4}$ | $4.84380 \times 10^{-3}$ | $2.77513 \times 10^{-3}$ | $6.52299 \times 10^{-4}$ | $-7.08376 \times 10^{-4}$ |
| $A_9$ | 0.00000 | 0.00000 | 0.00000 | 0.00000 | $4.41906 \times 10^{-3}$ | $2.59369 \times 10^{-3}$ |
| $A_{10}$ | 0.00000 | 0.00000 | 0.00000 | 0.00000 | $3.52663 \times 10^{-4}$ | $4.96388 \times 10^{-4}$ |

Aspherical equation $$Z = \frac{Y^2/R}{1 + \sqrt{1 - K \times Y^2/R^2}} + \sum_{i=3}^{10} A_i Y^i \quad (3)$$

where,

Z: length of perpendicular extended from point on aspherical surface at a distance Y from optical axis to contact plane (plane orthogonal to optical axis) of apex of aspherical surface Y: distance from optical axis R: radius of curvature at the vicinity of optical axis of aspherical surface K: eccentricity $A_i$: aspherical coefficient (i=3 through 10)

Further, FIG. 3 illustrates aberration diagrams showing various aberrations (spherical aberration, astigmatism, distortion, lateral color, comma aberration) of the wide angle imaging lens according to Example 1. Further, in the aberration diagrams, ω designates a semi angle of view, further, respective aberration diagrams of astigmatism show aberrations in a sagittal image surface and a tangential image surface (the same in FIGS. 5, 7, 9, 11, 13, 15, 17, 19, 21, 23 and 25).

As shown by Tables 1 and 13 and FIG. 3, according to the wide angle imaging lens of Example 1, |Z5/Z6|=25.225, d8/L=0.188, f/D=0.151, f/f$_2$=--0.705 and f/f$_3$=0.538, and therefore, all of Condition Equations (1), (2), (4), (5) and (6) are satisfied, and there is constituted the wide angle imaging lens having a wide angle of an angle of view of 2ω of 155.0° and having a high function capable of excellently correcting the respective aberrations.

Example 2

Figure 4:
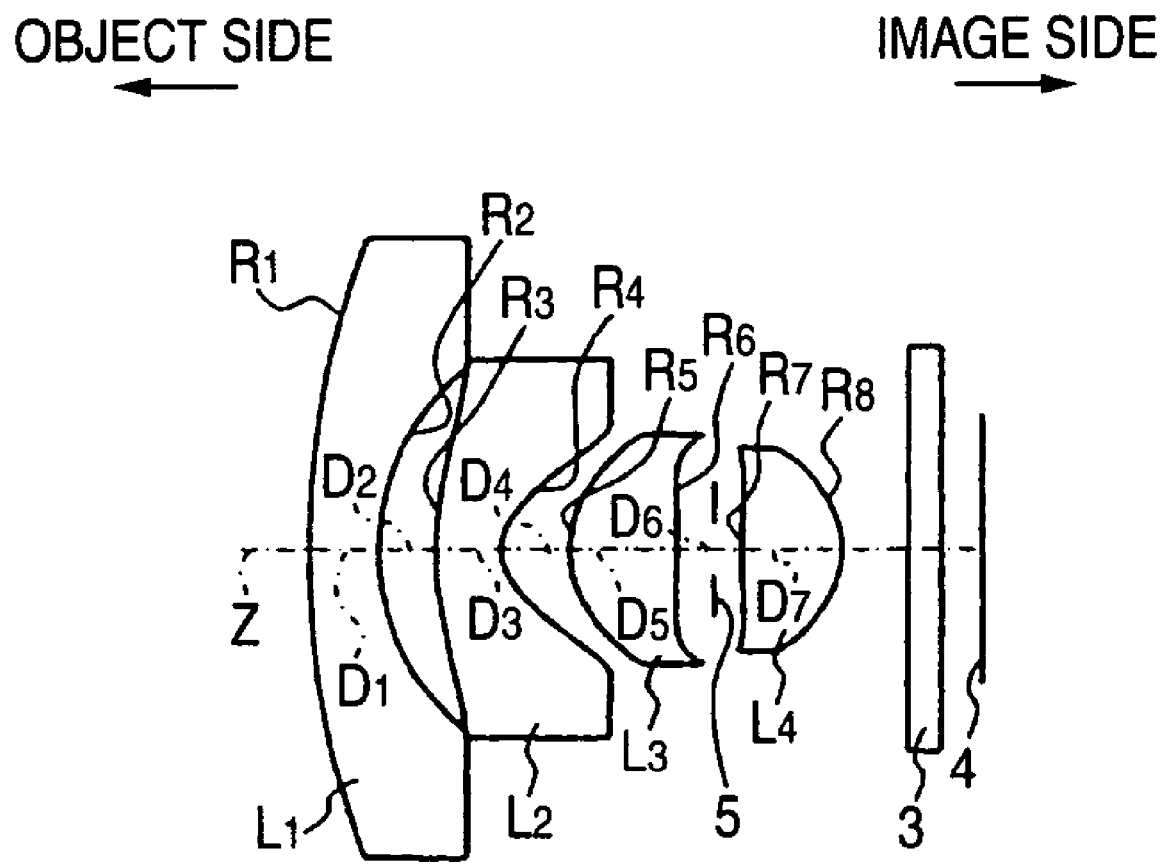
FIG. 4 is a view showing a constitution of a wide angle imaging lens according to Example 2.

A constitution of a wide angle imaging lens according to Example 2 is as shown by FIG. 4.

The constitution of the small-sized large aperture wide angle lens according to Example 2 is basically similar to that of Example 1.

Specific data are shown with regard to Example 2 as follows.

Further, names of materials of respective lenses shown in an upper stage of Table 2 are the same as those shown in Table 1.

TABLE 2

| surface | R | D | $N_e$ | $v_d$ | |
|---|---|---|---|---|---|
| 1 | 13.3436 | 1.00 | 1.77621 | 49.6 | S-LAH66 |
| 2 | 3.4340 | 0.84 | | | |
| 3 | 3.9536 | 1.00 | 1.51081 | 56.0 | ZEONEX |
| 4 | 0.7133 | 1.02 | | | |
| 5 | 1.6447 | 1.60 | 1.58820 | 30.3 | PC |
| 6 | −9.5785 | 0.94 | | | |
| 7 | 5.1269 | 1.50 | 1.51081 | 56.0 | ZEONEX |
| 8 | −1.3343 | | | | |
| dG | 0.50 | | Z5 | 0.959 | |
| NG | 1.52 | | Z6 | −0.002 | |
| f | 1.09 | | Z5/Z6 | −570.453 | |
| 2ω | 143.2° | | d8 | 1.926 | |
| | | | L | 9.824 | |
| | | | d8/L | 0.196 | |

Aspherical Coefficient

| | surface No. | | | | | |
|---|---|---|---|---|---|---|
| | 3 | 4 | 5 | 6 | 7 | 8 |
| K | $4.90040 \times 10^{-1}$ | $-7.34729 \times 10^{-2}$ | $6.27911 \times 10^{-1}$ | $9.85716 \times 10^{-1}$ | $-1.76304 \times 10^{-1}$ | $-4.36653$ |
| $A_3$ | $3.64977 \times 10^{-4}$ | $1.04945 \times 10^{-2}$ | $2.49234 \times 10^{-2}$ | $3.86908 \times 10^{-2}$ | $-3.49716 \times 10^{-2}$ | $-1.84425 \times 10^{-1}$ |
| $A_4$ | $-2.35007 \times 10^{-2}$ | $-7.60706 \times 10^{-3}$ | $2.75903 \times 10^{-3}$ | $8.53414 \times 10^{-4}$ | $-1.09934 \times 10^{-1}$ | $6.58542 \times 10^{-2}$ |
| $A_5$ | $6.61569 \times 10^{-3}$ | $-2.00756 \times 10^{-2}$ | $2.08673 \times 10^{-3}$ | $-1.82888 \times 10^{-3}$ | $1.18515 \times 10^{-1}$ | $-2.36348 \times 10^{-2}$ |
| $A_6$ | $6.51383 \times 10^{-4}$ | $-1.66082 \times 10^{-3}$ | $-2.04615 \times 10^{-2}$ | $7.79970 \times 10^{-3}$ | $-4.27242 \times 10^{-2}$ | $2.97507 \times 10^{-2}$ |
| $A_7$ | $-7.03181 \times 10^{-4}$ | $3.05938 \times 10^{-3}$ | $3.08596 \times 10^{-3}$ | $8.39838 \times 10^{-3}$ | $4.43096 \times 10^{-4}$ | $-2.02055 \times 10^{-2}$ |
| $A_8$ | $8.91149 \times 10^{-5}$ | $-1.57279 \times 10^{-3}$ | $2.61332 \times 10^{-3}$ | $1.01772 \times 10^{-3}$ | $5.28871 \times 10^{-5}$ | $-7.66216 \times 10^{-4}$ |
| $A_9$ | 0.00000 | 0.00000 | 0.00000 | 0.00000 | $-6.19528 \times 10^{-4}$ | $-1.02325 \times 10^{-4}$ |
| $A_{10}$ | 0.00000 | 0.00000 | 0.00000 | 0.00000 | $1.46318 \times 10^{-4}$ | $-1.19861 \times 10^{-4}$ |

Further, FIG. 5 illustrates aberration diagrams showing various aberrations (spherical aberration, astigmatism, distortion, lateral color, comma aberration) of the wide angle imaging lens according to Example 2.

As shown by Tables 2 and 13 and FIG. 5, according to the wide angle imaging lens of Example 2, $|Z5/Z6|=570.453$, $d8/L=0.196$, $f/D=0.138$, $f/f_2=-0.572$ and $f/f_3=0.432$, and therefore, all of Condition Equations (1), (2), (4), (5) and (6) are satisfied and there is constituted the wide angle imaging lens having a wide angle of an angle of view of $2\omega$ of 143.2° and having a high function capable of excellently correcting respective aberrations.

Example 3

Figure 6:
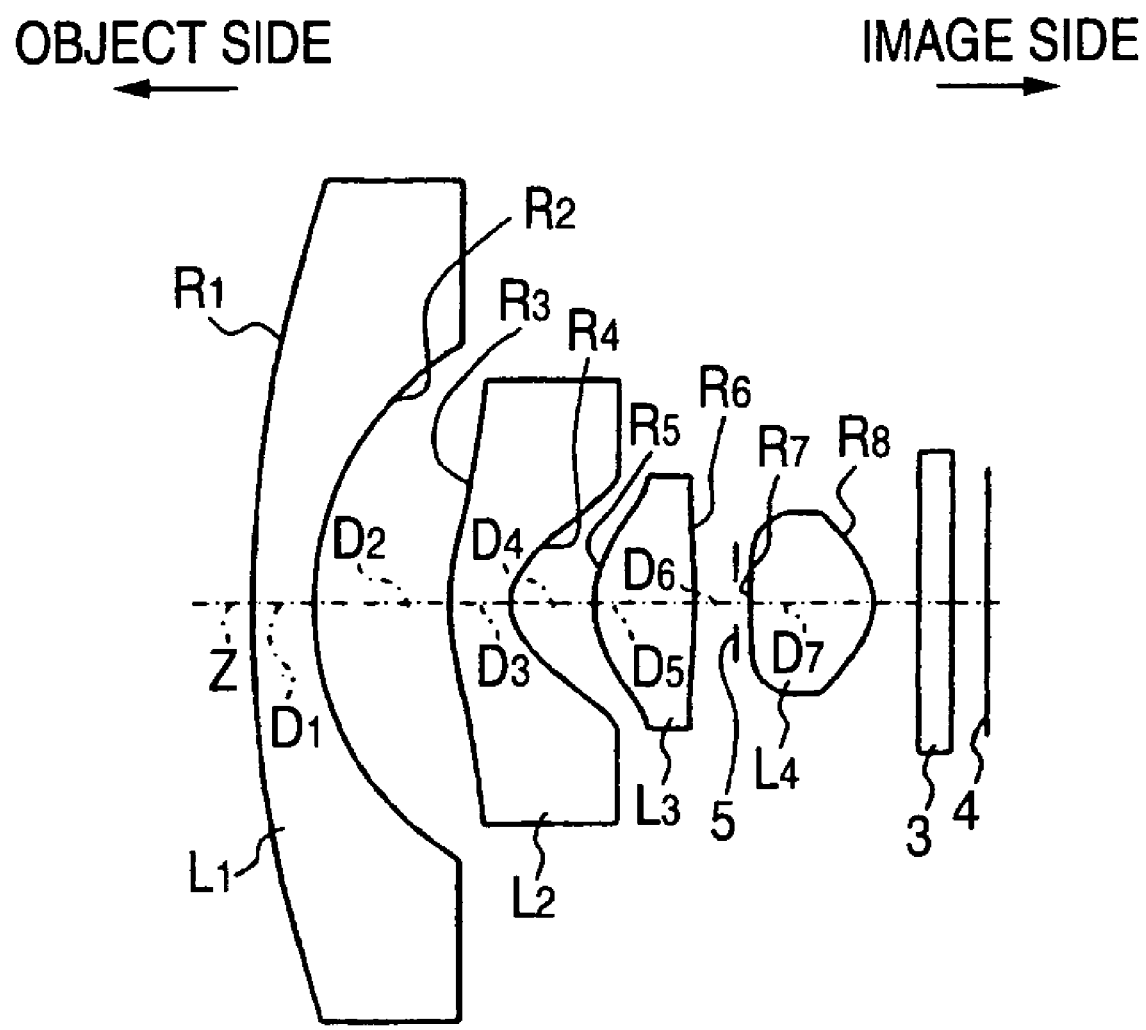
FIG. 6 is a view showing a constitution of a wide angle imaging lens according to Example 3.

A constitution of a wide angle imaging lens according to Example 3 is as shown by FIG. 6.

The constitution of the wide angle imaging lens according to Example 3 is basically similar to that of Example 2.

Specific data are shown with regard to Example 3 as follows.

Further, names of materials of respective lenses shown in an upper stage of Table 3 are the same as those shown in Table 1.

TABLE 3

| surface | R | D | $N_e$ | $\nu_d$ | |
|---|---|---|---|---|---|
| 1 | 21.5859 | 1.00 | 1.51872 | 49.6 | S-LAH66 |
| 2 | 5.0000 | 2.28 | | | |
| 3 | 3.5616 | 1.00 | 1.51081 | 56.0 | ZEONEX |
| 4 | 0.8001 | 1.41 | | | |
| 5 | 1.8637 | 1.66 | 1.58820 | 30.3 | PC |
| 6 | −11.0518 | 0.94 | | | |
| 7 | 9.4284 | 2.04 | 1.51081 | 56.0 | ZEONEX |
| 8 | −1.1814 | | | | |
| dG | 0.55 | | Z5 | 0.852 | |
| NG | 1.52 | | Z6 | −0.063 | |
| f | 1.12 | | Z5/Z6 | −13.423 | |
| $2\omega$ | 139.4° | | d8 | 1.684 | |
| | | | L | 12.021 | |
| | | | d8/L | 0.140 | |

Aspherical Coefficient

| | surface No. | | | | | |
|---|---|---|---|---|---|---|
| | 3 | 4 | 5 | 6 | 7 | 8 |
| K | $4.73127 \times 10^{-1}$ | $-7.39188 \times 10^{-2}$ | $6.05540 \times 10^{-1}$ | $9.85625 \times 10^{-1}$ | $-1.72796 \times 10^{-1}$ | $-4.25623$ |
| $A_3$ | $-9.12033 \times 10^{-3}$ | $7.45945 \times 10^{-3}$ | $-5.76986 \times 10^{-3}$ | $2.49301 \times 10^{-2}$ | $-1.18470 \times 10^{-2}$ | $-2.11184 \times 10^{-1}$ |
| $A_4$ | $-2.48850 \times 10^{-2}$ | $-7.91869 \times 10^{-3}$ | $3.40054 \times 10^{-3}$ | $-1.34400 \times 10^{-3}$ | $-1.06296 \times 10^{-1}$ | $6.44380 \times 10^{-2}$ |
| $A_5$ | $8.23694 \times 10^{-3}$ | $-1.39967 \times 10^{-2}$ | $1.32686 \times 10^{-2}$ | $-1.56334 \times 10^{-2}$ | $1.47073 \times 10^{-1}$ | $-2.19787 \times 10^{-2}$ |
| $A_6$ | $-8.89642 \times 10^{-4}$ | $-1.29388 \times 10^{-3}$ | $-1.48145 \times 10^{-2}$ | $6.84676 \times 10^{-3}$ | $-4.08180 \times 10^{-2}$ | $3.01625 \times 10^{-2}$ |
| $A_7$ | 0.00000 | $5.54392 \times 10^{-4}$ | 0.00000 | 0.00000 | $1.19714 \times 10^{-2}$ | $-1.56759 \times 10^{-2}$ |
| $A_8$ | 0.00000 | 0.00000 | $6.74181 \times 10^{-8}$ | 0.00000 | $7.19987 \times 10^{-4}$ | $-3.96106 \times 10^{-4}$ |
| $A_9$ | 0.00000 | 0.00000 | 0.00000 | 0.00000 | $3.02518 \times 10^{-3}$ | $3.11810 \times 10^{-3}$ |
| $A_{10}$ | 0.00000 | 0.00000 | 0.00000 | 0.00000 | $3.26160 \times 10^{-4}$ | $1.36048 \times 10^{-4}$ |

Further, FIG. 7 illustrates aberration diagrams of various aberrations (spherical aberration, astigmatism, distortion, lateral color, comma aberration) of the wide angle imaging lens according to Example 3.

As shown by Tables 3 and 13 and FIG. 7, according to the wide angle imaging lens of Example 3, |Z5/Z6|=13.423, d8/L=0.140, f/D=0.108, f/$f_2$=−0.487 and f/$f_3$=0.394, and therefore, all of Condition Equations (1), (2), (4), (5) and (6) are satisfied, and there is constituted the wide angle imaging lens having a wide angle of an angle of view of 2ω of 139.4° and having a high function capable of excellently correcting respective aberrations.

Example 4

Figure 8:
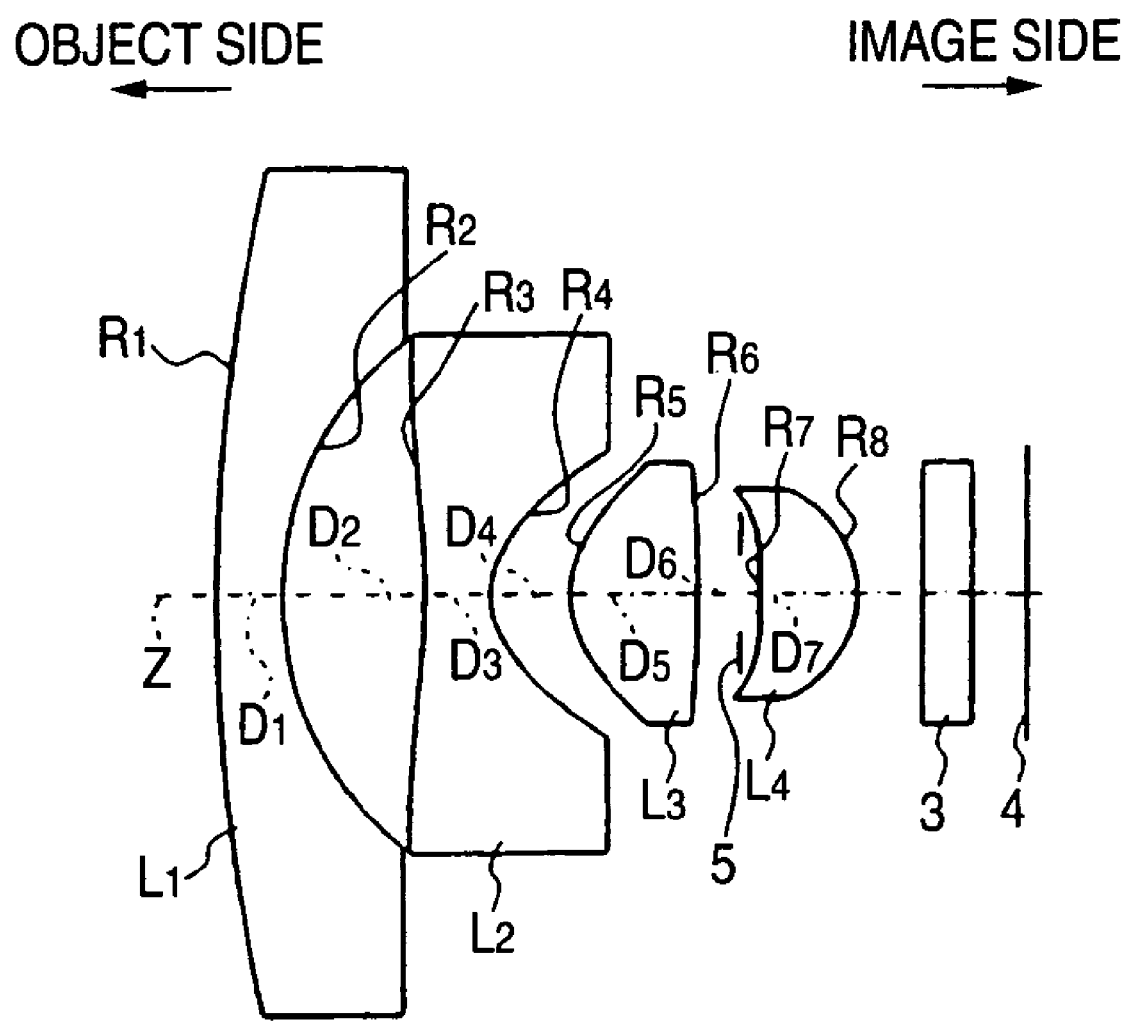
FIG. 8 is a view showing a constitution of a wide angle imaging lens according to Example 4.

A constitution of a wide angle imaging lens according to Example 4 is as shown by FIG. 8.

Although the constitution of the wide angle lens according to Example 4 is basically similar to that of Example 3, the constitution differs from that of Example 3 in that a shape of a surface on the object side of the second lens $L_2$ becomes a concave shape at a vicinity of the optical axis Z.

Specific Data are shown with Regard to Example 4.

In names of materials of respective lenses shown in an upper stage of Table 4, BSC7 of the first lens $L_1$ is a product name of a glass material made by HOYA Kabushiki Kaisha and other names of materials of lens $L_2$ through lens $L_4$ are the same as those shown in Table 1.

Further, FIG. 9 illustrates aberration diagrams showing various aberrations (spherical aberration, astigmatism, distortion, lateral color, comma aberration) of the wide angle imaging lens according to Example 4.

As shown by Tables 4 and 13 and FIG. 9, according to the wide angle imaging lens of Example 4, |Z5/Z6|=28.857, d8/L=0.192, f/D=0.143, f/$f_2$=−0.729 and f/$f_3$=0.539, and therefore, all of Condition Equations (1), (2), (4), (5) and (6) are satisfied are satisfied and there is constituted the wide angle imaging lens having a wide angle of an angle of view of 2ω of 161.4° and having a high function capable of excellently correcting respective aberrations.

Example 5

Figure 10:
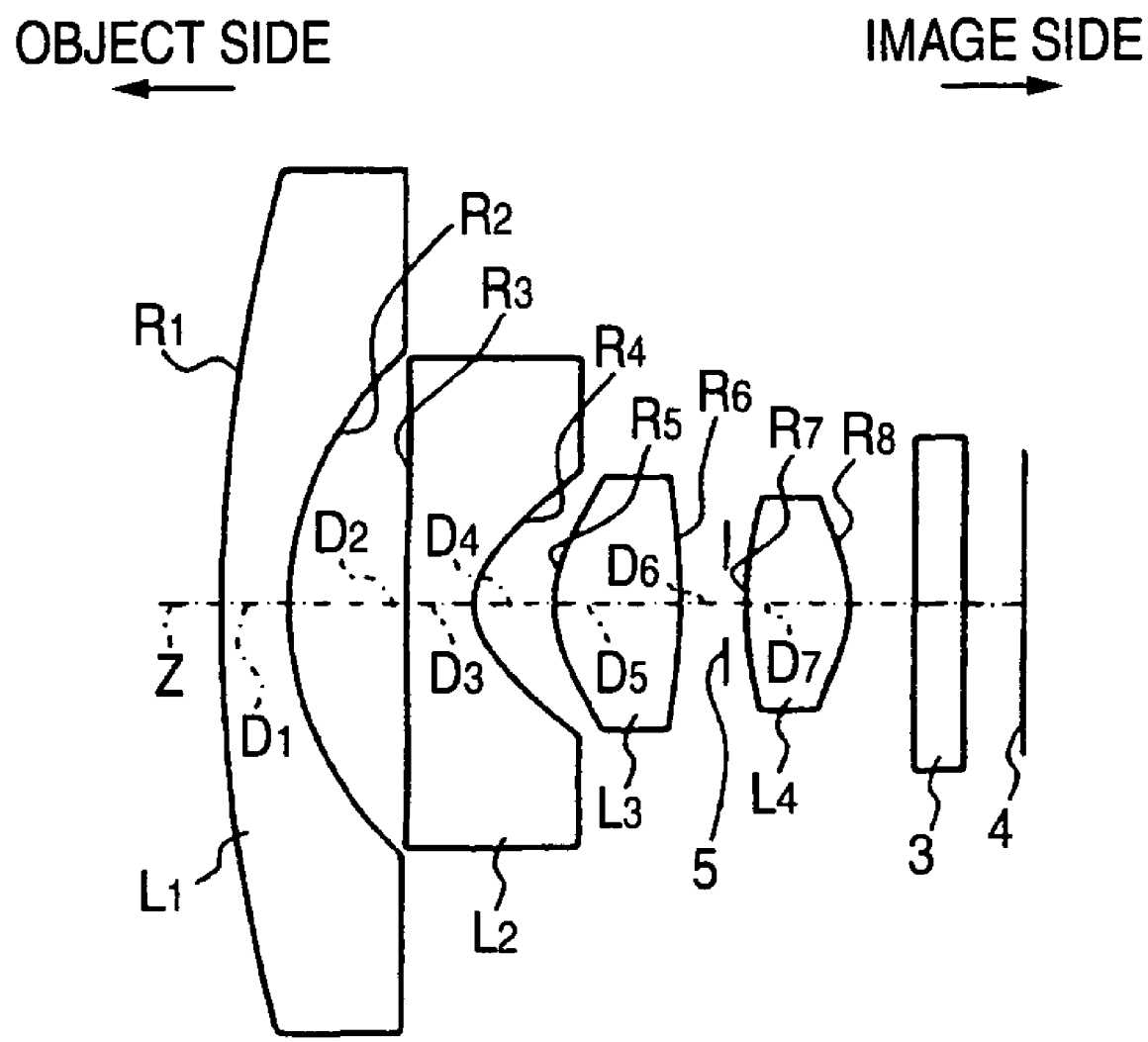
FIG. 10 is a view showing a constitution of a wide angle imaging lens according to Example 5.

A constitution of a wide angle imaging lens according to Example 5 is as shown by FIG. 10.

The constitution of the wide angle lens according to Example 5 is basically similar to that of Example 3.

Specific data are shown with regard to Example 5 as follows. Further, names of materials of respective lenses shown in an upper stage of Table 5 are the same as those shown in Table 4.

TABLE 4

| surface | R | D | $N_e$ | $v_d$ | |
|---|---|---|---|---|---|
| 1 | 29.0159 | 1.00 | 1.51872 | 64.2 | BSC7 |
| 2 | 5.0011 | 2.20 | | | |
| 3 | −7.7023 | 1.00 | 1.51081 | 56.0 | ZEONEX |
| 4 | 1.1793 | 1.24 | | | |
| 5 | 1.5929 | 1.95 | 1.58820 | 30.3 | PC |
| 6 | −23.273 | 0.93 | | | |
| 7 | 36.7549 | 1.50 | 1.51081 | 56.0 | ZEONEX |
| 8 | −1.6591 | | | | |
| dG | 0.75 | | Z5 | 0.960 | |
| NG | 1.52 | | Z6 | −0.033 | |
| f | 1.41 | | Z5/Z6 | −28.857 | |
| 2ω | 161.4° | | d8 | 2.326 | |
| | | | L | 12.146 | |
| | | | d8/L | 0.192 | |

Aspherical Coefficient surface No.

| | 3 | 4 | 5 | 6 | 7 | 8 |
|---|---|---|---|---|---|---|
| K | −3.82180 | −2.45075 | −1.36227 × 10 | 1.09871 | 9.47972 × $10^{-1}$ | 9.52628 × $10^{-1}$ |
| $A_3$ | 1.56526 × $10^{-2}$ | 1.02281 × $10^{-1}$ | 2.01119 × $10^{-1}$ | 3.65364 × $10^{-3}$ | −3.17506 × $10^{-2}$ | −6.63334 × $10^{-3}$ |
| $A_4$ | −1.45922 × $10^{-3}$ | −1.15039 × $10^{-2}$ | −5.33174 × $10^{-2}$ | −2.16041 × $10^{-3}$ | −4.52884 × $10^{-2}$ | 1.53411 × $10^{-2}$ |
| $A_5$ | 0.00000 | 0.00000 | 0.00000 | 0.00000 | 0.00000 | 0.00000 |
| $A_6$ | 0.00000 | 0.00000 | 0.00000 | 0.00000 | 0.00000 | 0.00000 |
| $A_7$ | 0.00000 | 0.00000 | 0.00000 | 0.00000 | 0.00000 | 0.00000 |
| $A_8$ | 0.00000 | 0.00000 | 0.00000 | 0.00000 | 0.00000 | 0.00000 |
| $A_9$ | 0.00000 | 0.00000 | 0.00000 | 0.00000 | 0.00000 | 0.00000 |
| $A_{10}$ | 0.00000 | 0.00000 | 0.00000 | 0.00000 | 0.00000 | 0.00000 |

TABLE 5

| surface | R | D | $N_e$ | $\nu_d$ | |
|---|---|---|---|---|---|
| 1 | 25.0000 | 1.00 | 1.51872 | 64.2 | BSC7 |
| 2 | 5.0000 | 1.80 | | | |
| 3 | 23.4372 | 1.00 | 1.51081 | 56.0 | ZEONEX |
| 4 | 0.9666 | 1.24 | | | |
| 5 | 2.0292 | 1.90 | 1.58820 | 30.3 | PC |
| 6 | −8.3724 | 0.98 | | | |
| 7 | 4.9111 | 1.50 | 1.51081 | 56.0 | ZEONEX |
| 8 | −2.0311 | | | | |
| dG | 0.75 | | Z5 | 0.619 | |
| NG | 1.52 | | Z6 | −0.081 | |
| f | 1.38 | | Z5/Z6 | −7.615 | |
| 2ω | 152° | | d8 | 2.338 | |
| | | | L | 11.758 | |
| | | | d8/L | 0.199 | |

Aspherical Coefficient

| | surface No. | | | | | |
|---|---|---|---|---|---|---|
| | 3 | 4 | 5 | 6 | 7 | 8 |
| K | $9.71605 \times 10^{-1}$ | $-6.99636 \times 10^{-1}$ | −5.29369 | 1.12479 | 1.00094 | $-4.73286 \times 10^{-1}$ |
| $A_3$ | $-8.26189 \times 10^{-3}$ | $8.21730 \times 10^{-2}$ | $8.93572 \times 10^{-2}$ | $-6.56103 \times 10^{-4}$ | $-83117 \times 10^{-2}$ | $-4.58615 \times 10^{-3}$ |
| $A_4$ | $7.41952 \times 10^{-4}$ | $-2.61282 \times 10^{-2}$ | $-3.16040 \times 10^{-2}$ | $3.76933 \times 10^{-3}$ | $5.05218 \times 10^{-3}$ | $2.46108 \times 10^{-2}$ |
| $A_5$ | 0.00000 | 0.00000 | 0.00000 | 0.00000 | 0.00000 | 0.00000 |
| $A_6$ | 0.00000 | 0.00000 | 0.00000 | 0.00000 | 0.00000 | 0.00000 |
| $A_7$ | 0.00000 | 0.00000 | 0.00000 | 0.00000 | 0.00000 | 0.00000 |
| $A_8$ | 0.00000 | 0.00000 | 0.00000 | 0.00000 | 0.00000 | 0.00000 |
| $A_9$ | 0.00000 | 0.00000 | 0.00000 | 0.00000 | 0.00000 | 0.00000 |
| $A_{10}$ | 0.00000 | 0.00000 | 0.00000 | 0.00000 | 0.00000 | 0.00000 |

Further, FIG. 11 illustrates aberration diagrams showing various aberrations (spherical aberration, astigmatism, distortion, lateral color, comma aberration) of the wide angle imaging lens according to Example 5.

As shown by Tables 5 and 13 and FIG. 11, according to the wide angle imaging lens of Example 5, |Z5/Z6|=7.615, d8/L=0.199, f/D=0.147, f/$f_2$=−0.691 and f/$f_3$=0.465, and therefore, all of Condition Equations (1), (2), (4), (5) and (6) are satisfied are satisfied, and there is constituted the wide angle imaging lens having a wide angle of an angle of view of 2ω of 152.0° and having a high function capable of excellently correcting respective aberrations.

Example 6

Figure 12:
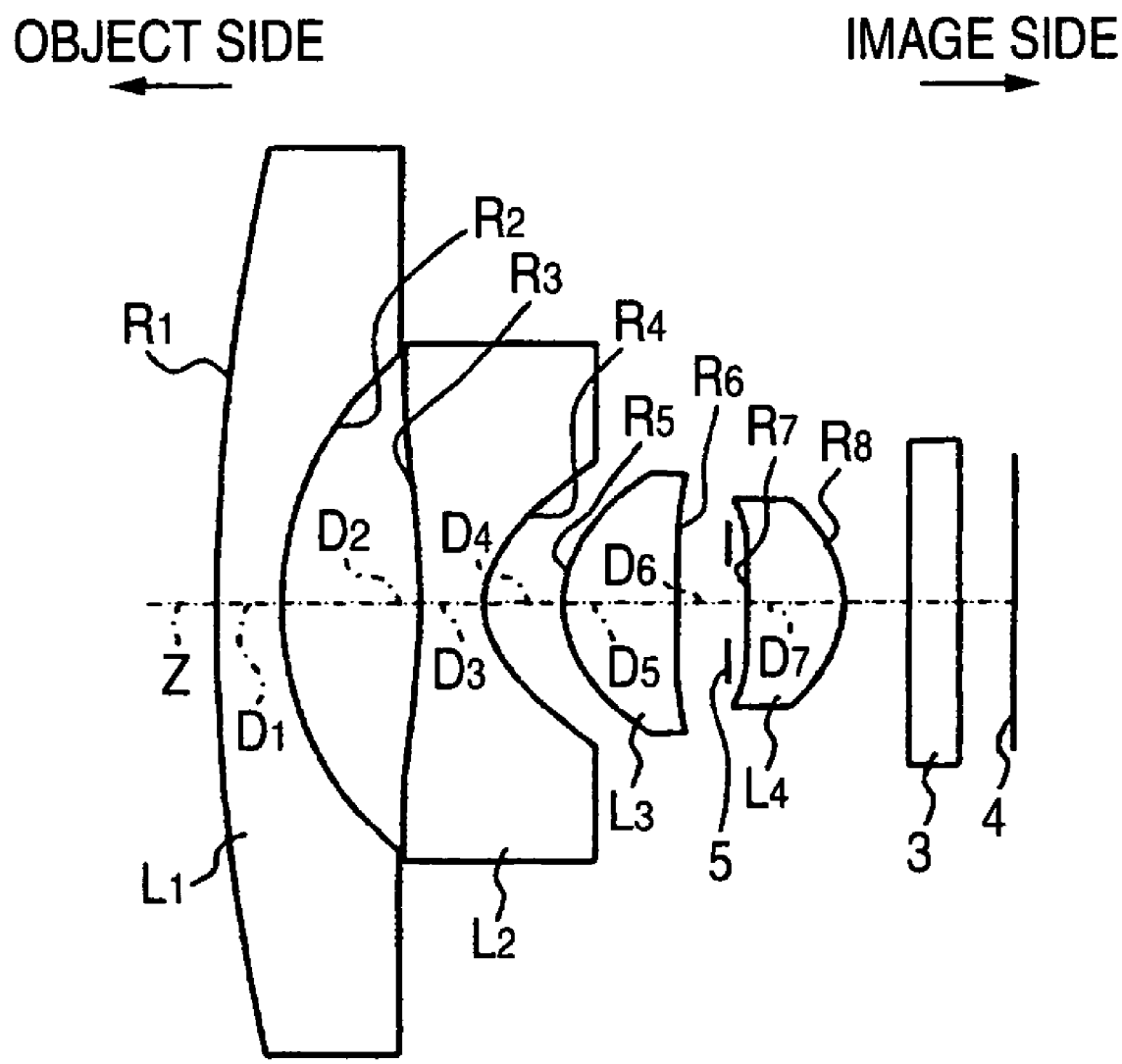
FIG. 12 is a view showing a constitution of a wide angle imaging lens according to Example 6.

A constitution of a wide angle imaging lens according to Example 6 is as shown by FIG. 12.

The constitution of the wide angle imaging lens according to Example 6 is basically similar to that of Example 4.

Specific data are shown with regard to Example 6 as follows.

Further, names of materials of respective lenses shown in an upper stage of Table 6 are the same as those shown in Table 4.

TABLE 6

| surface | R | D | $N_e$ | $\nu_d$ | |
|---|---|---|---|---|---|
| 1 | 32.4000 | 1.00 | 1.51872 | 64.2 | BSC7 |
| 2 | 5.0000 | 2.10 | | | |
| 3 | −8.6146 | 1.00 | 1.51081 | 56.0 | ZEONEX |
| 4 | 1.2042 | 1.24 | | | |
| 5 | 1.6663 | 1.80 | 1.58820 | 30.3 | PC |
| 6 | −19.7093 | 1.08 | | | |
| 7 | 16.1287 | 1.50 | 1.51081 | 56.0 | ZEONEX |
| 8 | −1.7078 | | | | |
| dG | 0.75 | | Z5 | 1.106 | |
| NG | 1.52 | | Z6 | 0.025 | |
| f | 1.41 | | Z5/Z6 | 44.939 | |
| 2ω | 160.4° | | d8 | 2.308 | |
| | | | L | 12.028 | |
| | | | d8/L | 0.192 | |

Aspherical Coefficient

| | surface No. | | | | | |
|---|---|---|---|---|---|---|
| | 3 | 4 | 5 | 6 | 7 | 8 |
| K | −1.17955 | −1.40654 | −4.45514 | 1.09790 | $9.45559 \times 10^{-1}$ | $4.86807 \times 10^{-1}$ |
| $A_3$ | $1.14912 \times 10^{-2}$ | $6.67473 \times 10^{-2}$ | $9.53666 \times 10^{-2}$ | $2.24054 \times 10^{-2}$ | $1.67362 \times 10^{-3}$ | $-5.14022 \times 10^{-4}$ |

TABLE 6-continued

| | | | | | |
|---|---|---|---|---|---|
| $A_4$ | $-3.27843 \times 10^{-4}$ | $-5.50281 \times 10^{-3}$ | $-3.32842 \times 10^{-3}$ | $3.44830 \times 10^{-3}$ | $-4.85980 \times 10^{-2}$ | $4.51857 \times 10^{-3}$ |
| $A_5$ | 0.00000 | 0.00000 | 0.00000 | 0.00000 | 0.00000 | 0.00000 |
| $A_6$ | 0.00000 | 0.00000 | 0.00000 | 0.00000 | 0.00000 | 0.00000 |
| $A_7$ | 0.00000 | 0.00000 | 0.00000 | 0.00000 | 0.00000 | 0.00000 |
| $A_8$ | 0.00000 | 0.00000 | 0.00000 | 0.00000 | 0.00000 | 0.00000 |
| $A_9$ | 0.00000 | 0.00000 | 0.00000 | 0.00000 | 0.00000 | 0.00000 |
| $A_{10}$ | 0.00000 | 0.00000 | 0.00000 | 0.00000 | 0.00000 | 0.00000 |

Further, FIG. 13 illustrates aberration diagrams showing various aberrations (spherical aberration, astigmatism, distortion, lateral color, comma aberration) of the wide angle imaging lens according to Example 6.

As shown by Tables 6 and 13 and FIG. 13, according to the wide angle imaging lens of Example 6, $|Z5/Z6|=44.939$, $d8/L=0.192$, $f/D=0.145$, $f/f_2=-0.706$ and $f/f_3=0.523$, and therefore, all of Condition Equations (1), (2), (4), (5) and (6) are satisfied and there is constituted the wide angle imaging lens having a wide angle of an angle of view of $2\omega$ of $160.4°$ and having a high function capable of excellently correcting respective abberations.

Example 7

Figure 14:
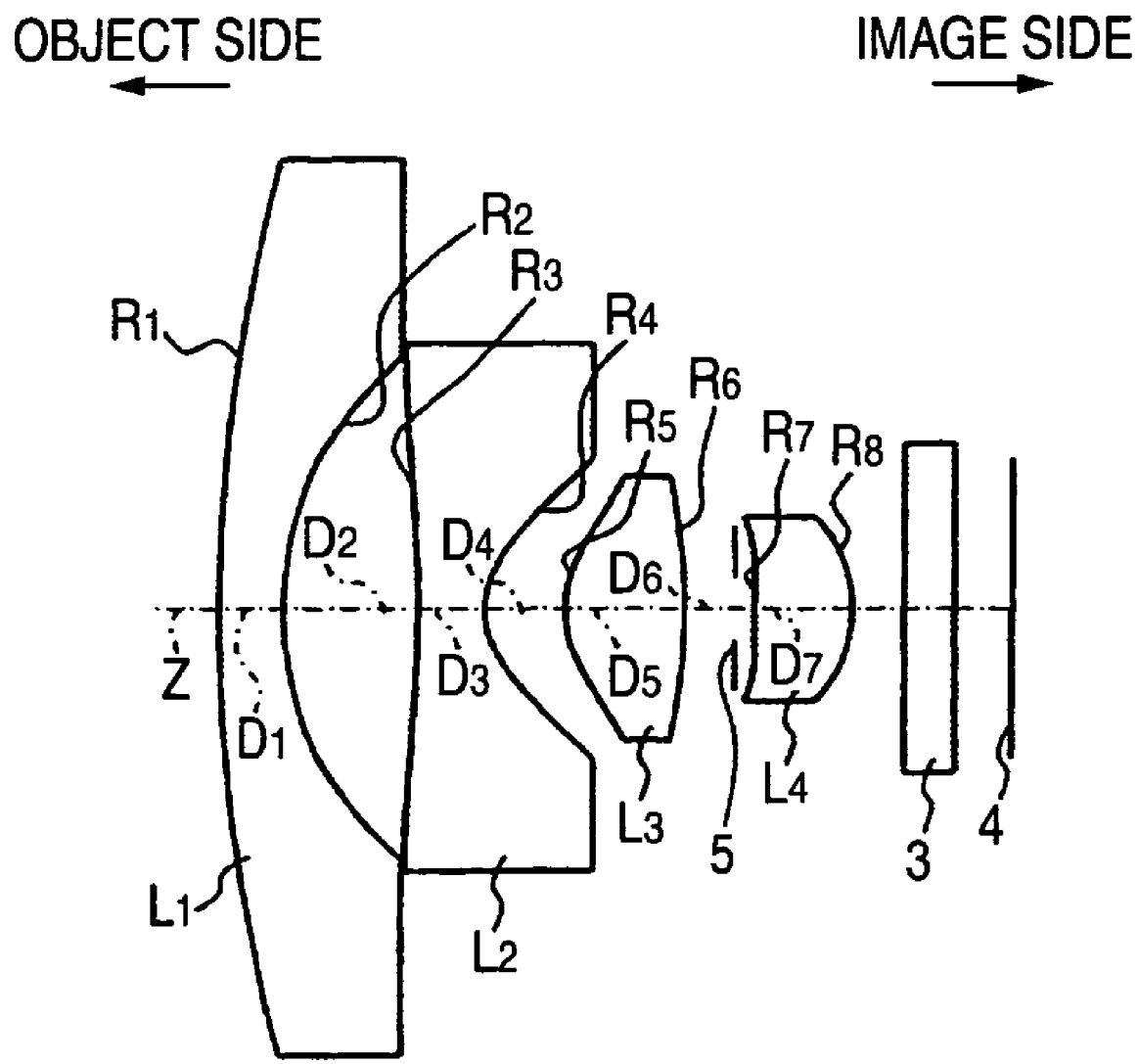
FIG. 14 is a view showing a constitution of a wide angle imaging lens according to Example 7.

A constitution of a wide angle imaging lens according to Example 7 is as shown by FIG. 14.

The constitution of the wide angle imaging lens according to Example 7 is basically similar to that of Example 6.

Specific data are shown with regard to Example 7 as follows.

Further, names of materials of respective lenses shown in an upper stage of Table 7 are the same as those shown in Table 4.

Further, FIG. 15 illustrates aberration diagrams showing various aberrations (spherical aberration, astigmatism, distortion, lateral color, comma aberration) of the wide angle imaging lens according to Example 7.

As shown by Tables 7 and 13 and FIG. 15, according to the wide angle imaging lens of Example 7, $|Z5/Z6|=5.985$, $d8/L=0.179$, $f/D=0.155$, $f/f_2=-0.608$ and $f/f_3=0.516$, and therefore, all of Condition Equations (1), (2), (4), (5) and (6) are satisfied are satisfied, and there is constituted the wide angle imaging lens having a wide angle of an angle of view of $2\omega$ of $148.8°$ and having a high function capable of excellently correcting respective aberrations.

Example 8

Figure 16:
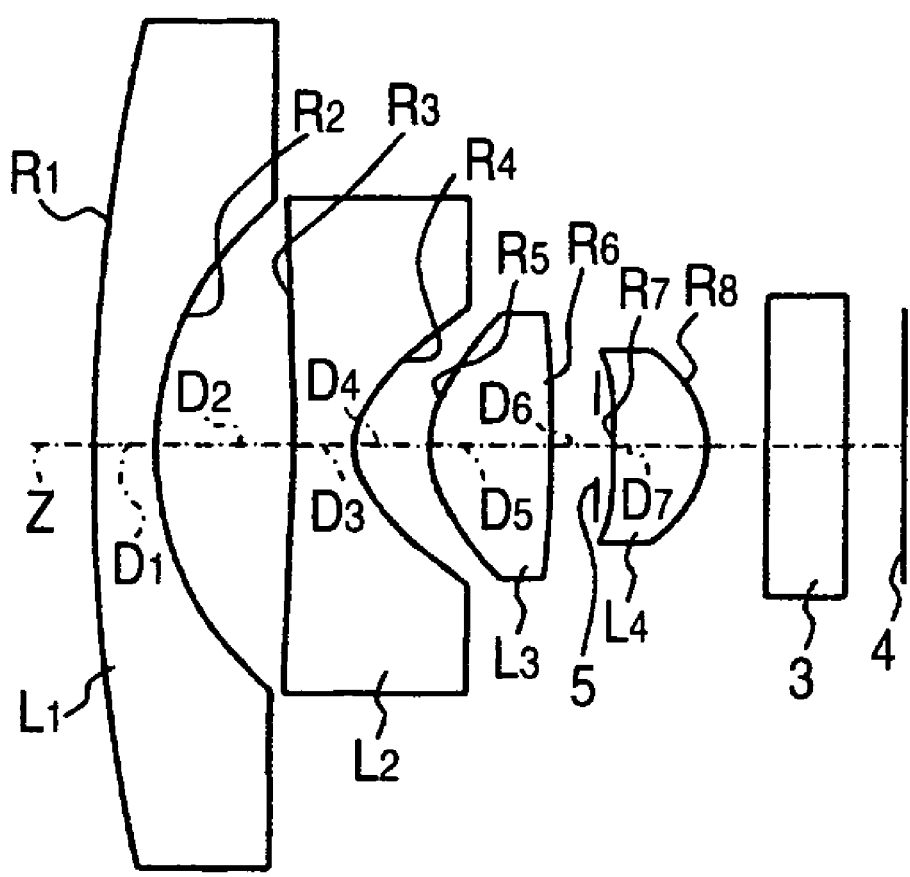
FIG. 16 is a view showing a constitution of a wide angle imaging lens according to Example 8.

A constitution of a wide angle imaging lens according to Example 8 is as shown by FIG. 16.

The constitution of the wide angle lens according to Example 8 is basically similar to that of Example 7.

Specific data are shown with regard to Example 8 as follows. In names of materials of respective lenses shown in an upper stage of Table 8, $S\text{-}BAL_{35}$ of the first lens $L_1$ is a product name of a glass material made by Kabushiki Kaisha Ohara and other names of materials of lens $L_2$ through lens $L_4$ are the same as those shown in Table 1.

TABLE 7

| surface | R | D | $N_e$ | $\nu_d$ | |
|---|---|---|---|---|---|
| 1 | 25.0000 | 1.00 | 1.51872 | 64.2 | BSC7 |
| 2 | 5.0000 | 1.98 | | | |
| 3 | −14.9677 | 1.00 | 1.51081 | 56.0 | ZEONEX |
| 4 | 1.3984 | 1.24 | | | |
| 5 | 1.9475 | 1.80 | 1.58820 | 30.3 | PC |
| 6 | −8.7928 | 1.10 | | | |
| 7 | 7.1389 | 1.50 | 1.51081 | 56.0 | ZEONEX |
| 8 | −1.8967 | | | | |
| dG | 0.75 | | Z5 | 0.812 | |
| NG | 1.52 | | Z6 | −0.136 | |
| f | 1.49 | | Z5/Z6 | −5.985 | |
| 2ω | 148.8° | | d8 | 2.099 | |
| | | | L | 11.719 | |
| | | | d8/L | 0.179 | |

Aspherical Coefficient surface No.

| | 3 | 4 | 5 | 6 | 7 | 8 |
|---|---|---|---|---|---|---|
| K | $7.20672 \times 10^{-1}$ | $-1.04262$ | $-1.06457$ | $1.01957$ | $9.68194 \times 10^{-1}$ | $5.44179 \times 10^{-1}$ |
| $A_3$ | $5.33578 \times 10^{-3}$ | $1.17105 \times 10^{-1}$ | $9.25082 \times 10^{-2}$ | $-1.11347 \times 10^{-2}$ | $-6.95857 \times 10^{-2}$ | $1.32730 \times 10^{-2}$ |
| $A_4$ | $6.47627 \times 10^{-5}$ | $-3.74968 \times 10^{-2}$ | $-4.37698 \times 10^{-2}$ | $6.34786 \times 10^{-3}$ | $-2.84903 \times 10^{-2}$ | $-1.49060 \times 10^{-2}$ |
| $A_5$ | 0.00000 | 0.00000 | 0.00000 | 0.00000 | 0.00000 | 0.00000 |
| $A_6$ | 0.00000 | 0.00000 | 0.00000 | 0.00000 | 0.00000 | 0.00000 |
| $A_7$ | 0.00000 | 0.00000 | 0.00000 | 0.00000 | 0.00000 | 0.00000 |
| $A_8$ | 0.00000 | 0.00000 | 0.00000 | 0.00000 | 0.00000 | 0.00000 |
| $A_9$ | 0.00000 | 0.00000 | 0.00000 | 0.00000 | 0.00000 | 0.00000 |
| $A_{10}$ | 0.00000 | 0.00000 | 0.00000 | 0.00000 | 0.00000 | 0.00000 |

TABLE 8

| surface | R | D | $N_e$ | $\nu_d$ | |
|---|---|---|---|---|---|
| 1 | 31.9906 | 1.00 | 1.59143 | 61.2 | S-BAL35 |
| 2 | 5.3200 | 2.20 | | | |
| 3 | −16.4469 | 1.00 | 1.51081 | 56.0 | ZEONEX |
| 4 | 1.2241 | 1.24 | | | |
| 5 | 1.9580 | 2.05 | 1.58820 | 30.3 | PC |
| 6 | −23.2730 | 1.00 | | | |
| 7 | 83.9222 | 1.60 | 1.51081 | 56.0 | ZEONEX |
| 8 | −1.5419 | | | | |
| dG | 1.30 | | Z5 | 0.831 | |
| NG | 1.52 | | Z6 | −0.032 | |
| f | 1.39 | | Z5/Z6 | −26.268 | |
| 2ω | 165.2° | | d8 | 2.734 | |
| | | | L | 12.874 | |
| | | | d8/L | 0.212 | |

Aspherical Coefficient

| | surface No. | | | | | |
|---|---|---|---|---|---|---|
| | 3 | 4 | 5 | 6 | 7 | 8 |
| K | −4.14022 | −3.60650 | −1.58257 × 10 | 1.09871 | $9.45942 \times 10^{-1}$ | $6.30443 \times 10^{-1}$ |
| $A_3$ | $9.83753 \times 10^{-3}$ | $1.56132 \times 10^{-1}$ | $1.49167 \times 10^{-1}$ | $3.65364 \times 10^{-3}$ | $-4.65915 \times 10^{-3}$ | $1.68888 \times 10^{-2}$ |
| $A_4$ | $-1.17600 \times 10^{-3}$ | $-3.37794 \times 10^{-2}$ | $-3.63377 \times 10^{-2}$ | $-2.16041 \times 10^{-3}$ | $-3.74120 \times 10^{-2}$ | $5.56012 \times 10^{-3}$ |
| $A_5$ | 0.00000 | 0.00000 | 0.00000 | 0.00000 | 0.00000 | 0.00000 |
| $A_6$ | 0.00000 | 0.00000 | 0.00000 | 0.00000 | 0.00000 | 0.00000 |
| $A_7$ | 0.00000 | 0.00000 | 0.00000 | 0.00000 | 0.00000 | 0.00000 |
| $A_8$ | 0.00000 | 0.00000 | 0.00000 | 0.00000 | 0.00000 | 0.00000 |
| $A_9$ | 0.00000 | 0.00000 | 0.00000 | 0.00000 | 0.00000 | 0.00000 |
| $A_{10}$ | 0.00000 | 0.00000 | 0.00000 | 0.00000 | 0.00000 | 0.00000 |

Further, FIG. 17 illustrates aberration diagrams showing various aberrations (spherical aberration, astigmatism, distortion, lateral color, comma aberration) of the wide angle imaging lens according to Example 8.

As shown by Tables 8 and 13 and FIG. 17, according to the wide angle imaging lens of Example 8, |Z5/Z6|=26.268, d8/L=0.212, f/D=0.137, f/$f_2$=−0.633 and f/$f_3$=0.438, and therefore, all of Condition Equations (1), (2), (4), (5) and (6) are satisfied and there is constituted the wide angle imaging lens having a wide angle of an angle of view of 2ω of 165.2° and having a high function capable of excellently correcting respective aberrations.

Example 9

Figure 18:
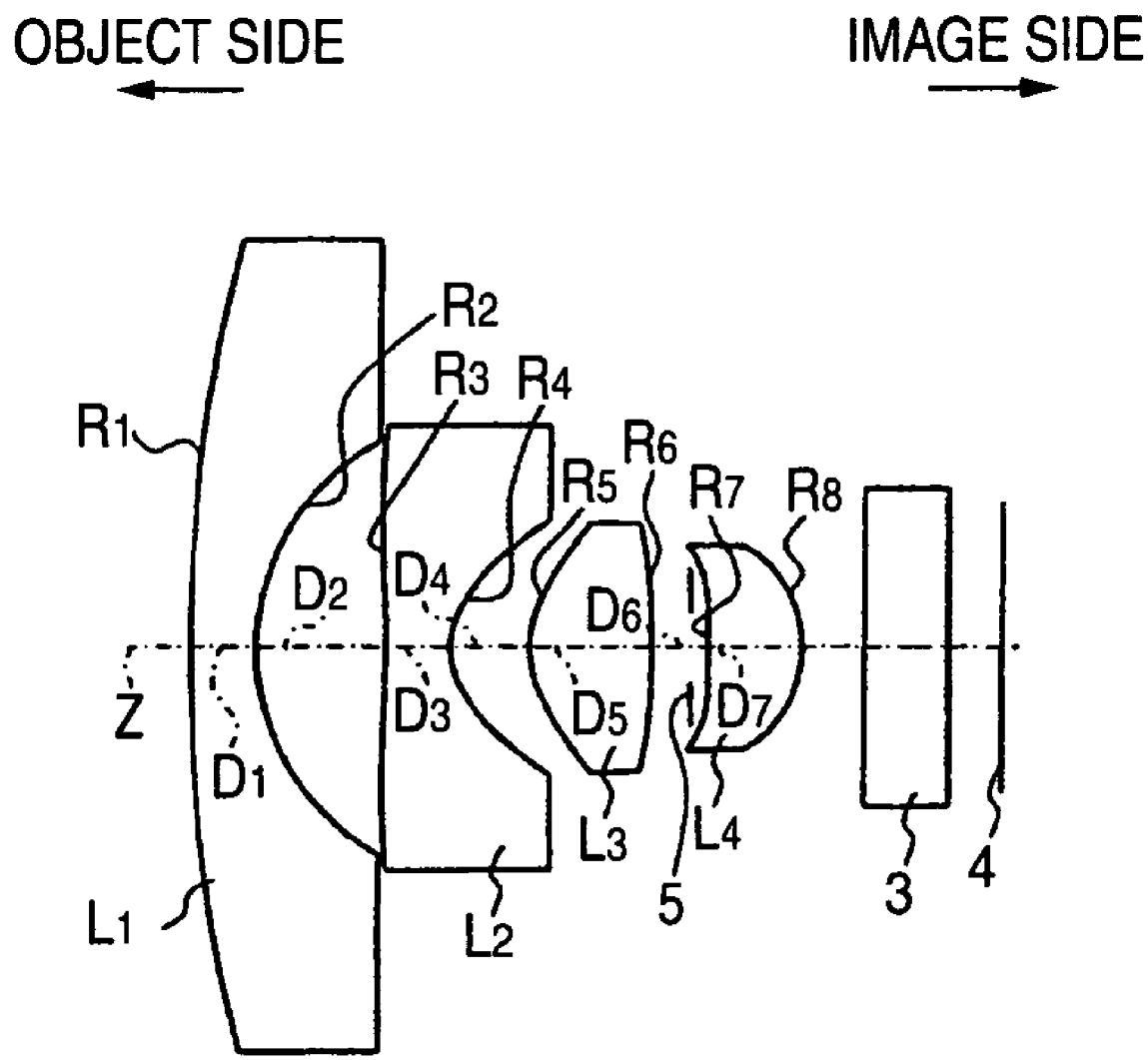
FIG. 18 is a view showing a constitution of a wide angle imaging lens according to Example 9.

A constitution of a wide angle imaging lens according to Example 9 is as shown by FIG. 18.

The constitution of the wide angle imaging lens according to Example 9 is basically similar to that of Example 8.

Specific data are shown with regard to Example 9 as follows.

Further, names of materials of respective lenses shown in an upper stage of Table 9 are the same as those shown in Table 4.

TABLE 9

| surface | R | D | $N_e$ | $\nu_d$ | |
|---|---|---|---|---|---|
| 1 | 26.1178 | 1.00 | 1.51872 | 64.2 | BSC7 |
| 2 | 3.7491 | 1.98 | | | |
| 3 | −10.6957 | 1.00 | 1.51081 | 56.0 | ZEONEX |
| 4 | 1.2269 | 1.24 | | | |
| 5 | 1.7679 | 1.95 | 1.58820 | 30.3 | PC |
| 6 | −16.4908 | 0.93 | | | |
| 7 | 28.4040 | 1.50 | 1.51081 | 56.0 | ZEONEX |
| 8 | −1.7980 | | | | |
| dG | 1.30 | | Z5 | 0.742 | |
| NG | 1.52 | | Z6 | −0.058 | |
| f | 1.43 | | Z5/Z6 | −12.866 | |
| 2ω | 156° | | d8 | 2.646 | |
| | | | L | 12.246 | |
| | | | d8/L | 0.216 | |

Aspherical Coefficient

| | surface No. | | | | | |
|---|---|---|---|---|---|---|
| | 3 | 4 | 5 | 6 | 7 | 8 |
| K | −3.82495 | −2.29831 | −1.36601 × 10 | 1.09870 | $9.47972 \times 10^{-1}$ | 1.15840 |
| $A_3$ | $2.18154 \times 10^{-2}$ | $1.05527 \times 10^{-1}$ | $1.72543 \times 10^{-1}$ | $-7.46690 \times 10^{-3}$ | $-2.27919 \times 10^{-2}$ | $3.97785 \times 10^{-3}$ |

TABLE 9-continued

| | | | | | |
|---|---|---|---|---|---|
| $A_4$ | $-2.73400 \times 10^{-3}$ | $-1.10934 \times 10^{-2}$ | $-4.98604 \times 10^{-2}$ | $-1.40997 \times 10^{-3}$ | $-4.56644 \times 10^{-2}$ | $1.61579 \times 10^{-2}$ |
| $A_5$ | 0.00000 | 0.00000 | 0.00000 | 0.00000 | 0.00000 | 0.00000 |
| $A_6$ | 0.00000 | 0.00000 | 0.00000 | 0.00000 | 0.00000 | 0.00000 |
| $A_7$ | 0.00000 | 0.00000 | 0.00000 | 0.00000 | 0.00000 | 0.00000 |
| $A_8$ | 0.00000 | 0.00000 | 0.00000 | 0.00000 | 0.00000 | 0.00000 |
| $A_9$ | 0.00000 | 0.00000 | 0.00000 | 0.00000 | 0.00000 | 0.00000 |
| $A_{10}$ | 0.00000 | 0.00000 | 0.00000 | 0.00000 | 0.00000 | 0.00000 |

Further, FIG. 19 illustrates aberration diagrams showing various aberrations (spherical aberration, astigmatism, distortion, lateral color, comma aberration) of the wide angle imaging lens according to Example 9.

As shown by Tables 9 and 13 and FIG. 19, according to the wide angle imaging lens of Example 9, |Z5/Z6|=12.866, d8/L=0.216, f/D=0.149, f/$f_2$=−0.681 and f/$f_3$=0.505, and therefore, all of Condition Equations (1), (2), (4), (5) and (6) are satisfied are satisfied and there is constituted the wide angle imaging lens having a wide angle of an angle of view of 2ω of 156.0° and having a high function capable of excellently correcting respective aberrations.

Example 10

Figure 20:
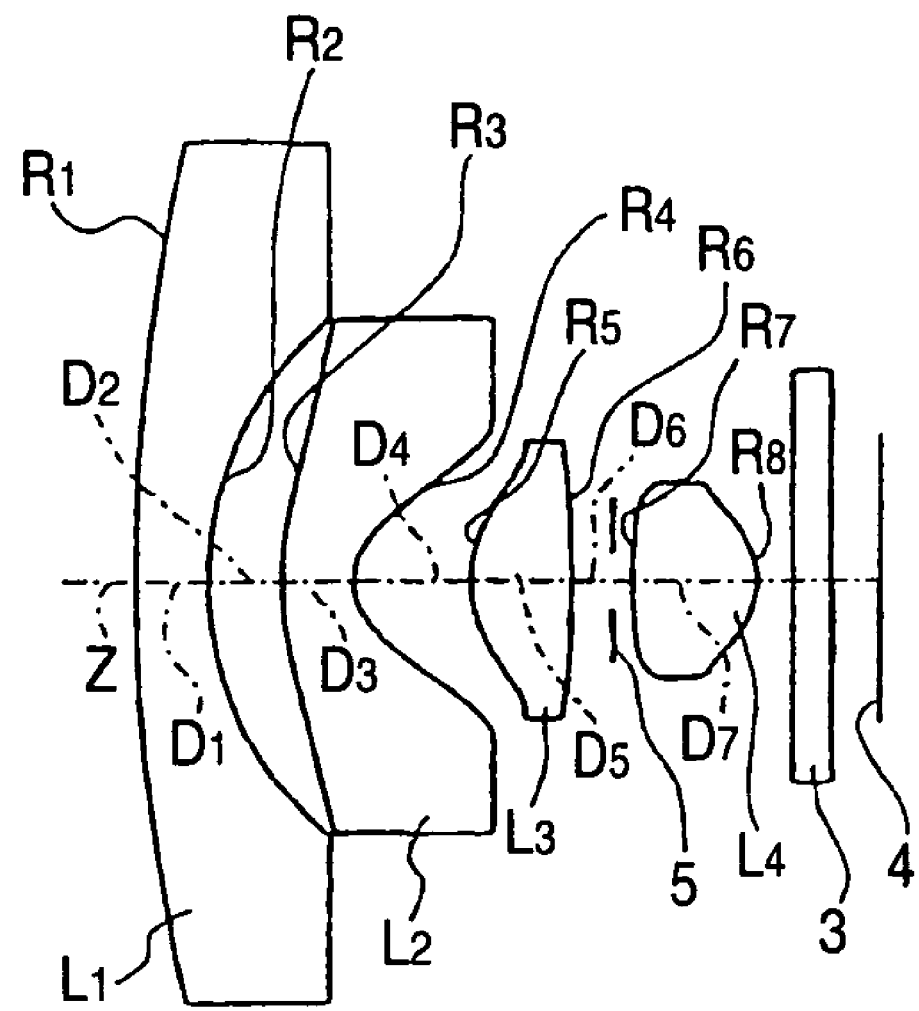
FIG. 20 is a view showing a constitution of a wide angle imaging lens according to Example 10.

A constitution of a wide angle imaging lens according to Example 10 is as shown by FIG. 20.

The constitution of the wide angle imaging lens according to Example 10 is basically similar to that of Example 1.

Specific data are shown with regard to Example 10 as follows.

Further, names of materials of respective lenses shown in an upper stage of Table 10 are the same as those shown in Table 4.

Further, FIG. 21 illustrates aberration diagrams showing various aberrations (spherical aberration, astigmatism, distortion, lateral color, comma aberration) of the wide angle imaging lens according to Example 10.

As shown by Tables 10 and 13 and FIG. 21, according to the wide angle imaging lens of Example 10, |Z5/Z6|=10.64, d8/L=0.160, f/D=0.118, f/$f_2$=−0.455 and f/$f_3$=0.349, and therefore, all of Condition Equations (1), (2), (4), (5) and (6) are satisfied are satisfied, and there is constituted the wide angle imaging lens having a wide angle of an angle of view of 2ω of 149.0° and having a high function capable of excellently correcting respective aberrations.

Example 11

Figure 22:
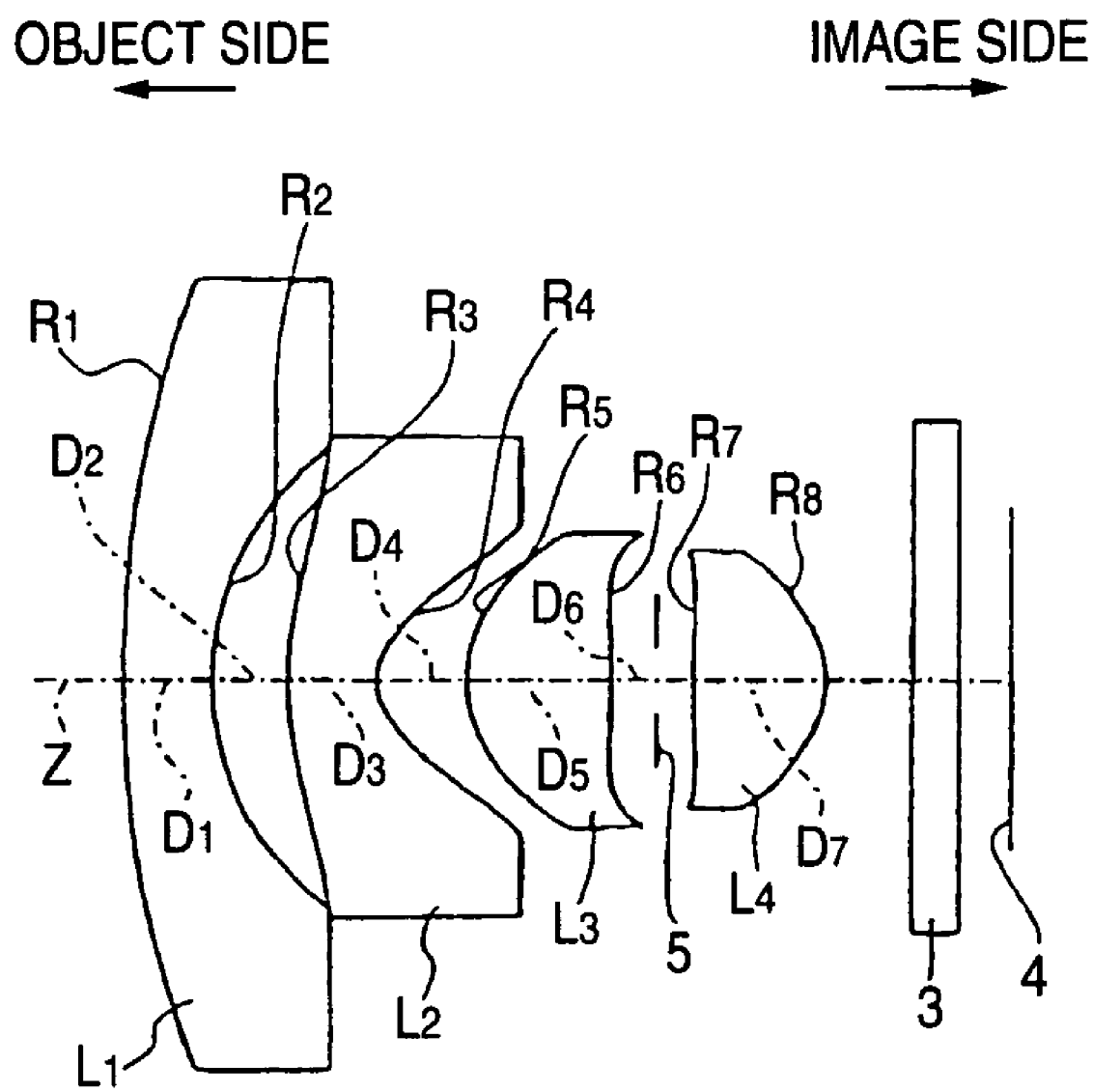
FIG. 22 is a view showing a constitution of a wide angle imaging lens according to Example 11.

A constitution of a wide angle imaging lens according to Example 11 is as shown by FIG. 22.

The constitution of the wide angle imaging lens according to Example 11 is basically similar to that of Example 1.

Specific data are shown with regard to Example 11 as follows.

Further, names of materials of respective lenses shown in an upper stage of Table 11 are the same as those shown in Table 1.

TABLE 10

| surface | R | D | $N_e$ | $v_d$ | |
|---|---|---|---|---|---|
| 1 | 28.9725 | 1.0000 | 1.51872 | 64.2 | BSC7 |
| 2 | 5.0000 | 1.0384 | | | |
| 3 | 3.4384 | 1.0000 | 1.51081 | 56.0 | ZEONEX |
| 4 | 0.7774 | 1.6441 | | | |
| 5 | 1.8572 | 1.4059 | 1.58820 | 30.3 | PC |
| 6 | −18.8700 | 1.8655 | | | |
| 7 | 7.4133 | 1.7545 | 1.51081 | 56.0 | ZEONEX |
| 8 | −1.1125 | | | | |
| dG | 0.50 | | Z5 | 0.751 | |
| NG | 1.52 | | Z6 | −0.071 | |
| f | 1.03 | | Z5/Z6 | −10.639 | |
| 2ω | 149.0° | | d8 | 1.662 | |
| | | | L | 10.370 | |
| | | | d8/L | 0.160 | |

Aspherical Coefficient

| | surface No. | | | | | |
|---|---|---|---|---|---|---|
| | 3 | 4 | 5 | 6 | 7 | 8 |
| K | $5.79478 \times 10^{-1}$ | $-7.75931 \times 10^{-2}$ | $6.28102 \times 10^{-1}$ | $9.85775 \times 10^{-1}$ | $-1.726947 \times 10^{-1}$ | $-4.23227$ |
| $A_3$ | $-9.85786 \times 10^{-3}$ | $4.20105 \times 10^{-3}$ | $4.71755 \times 10^{-3}$ | $1.51884 \times 10^{-2}$ | $-8.96936 \times 10^{-3}$ | $-2.19308 \times 10^{-1}$ |
| $A_4$ | $-2.47033 \times 10^{-2}$ | $-7.65152 \times 10^{-3}$ | $2.46477 \times 10^{-2}$ | $-1.31403 \times 10^{-3}$ | $-1.06709 \times 10^{-1}$ | $6.44627 \times 10^{-2}$ |
| $A_5$ | $8.55304 \times 10^{-3}$ | $-1.46061 \times 10^{-2}$ | $7.85350 \times 10^{-3}$ | $-1.78421 \times 10^{-3}$ | $1.42914 \times 10^{-1}$ | $-2.13767 \times 10^{-2}$ |
| $A_6$ | $-1.01961 \times 10^{-3}$ | $1.30787 \times 10^{-3}$ | $-1.55683 \times 10^{-2}$ | $7.09028 \times 10^{-2}$ | $-4.11137 \times 10^{-2}$ | $3.03307 \times 10^{-2}$ |
| $A_7$ | 0.00000 | $-1.82755 \times 10^{-4}$ | 0.00000 | 0.00000 | $1.00898 \times 10^{-2}$ | $-1.33316 \times 10^{-2}$ |
| $A_8$ | 0.00000 | 0.00000 | $6.74181 \times 10^{-8}$ | 0.00000 | $6.05961 \times 10^{-4}$ | $-2.26106 \times 10^{-4}$ |
| $A_9$ | 0.00000 | 0.00000 | 0.00000 | 0.00000 | $2.35114 \times 10^{-3}$ | $4.49993 \times 10^{-3}$ |
| $A_{10}$ | 0.00000 | 0.00000 | 0.00000 | 0.00000 | $2.86878 \times 10^{-4}$ | $1.54180 \times 10^{-4}$ |

TABLE 11

| surface | R | D | $N_e$ | $\nu_d$ | |
|---|---|---|---|---|---|
| 1 | 10.2609 | 1.00000 | 1.776208 | 49.6 | S-LAH66 |
| 2 | 4.0021 | 1.81867 | | | |
| 3 | 3.8812 | 1.00000 | 1.51081 | 56.0 | ZEONEX |
| 4 | 0.6601 | 0.86906 | | | |
| 5 | 1.3031 | 1.80000 | 1.58820 | 30.3 | PC |
| 6 | −12.8067 | 0.72000 | | | |
| 7 | 3.5823 | 1.50000 | 1.51081 | 56.0 | ZEONEX |
| 8 | −2.1764 | | | | |
| dG | 0.75 | | Z5 | 0.854 | |
| NG | 1.52 | | Z6 | −0.010 | |
| f | 1.47 | | Z5/Z6 | −87.960 | |
| 2ω | 145.2° | | d8 | 2.115 | |
| | | | L | 10.822 | |
| | | | d8/L | 0.195 | |

Aspherical Coefficient

| | surface No. | | | | | |
|---|---|---|---|---|---|---|
| | 3 | 4 | 5 | 6 | 7 | 8 |
| K | $4.53928 \times 10^{-1}$ | $-1.03036 \times 10^{-2}$ | $2.66090 \times 10^{-1}$ | $9.85185 \times 10^{-1}$ | $-2.04783 \times 10^{-1}$ | $-4.57902$ |
| $A_3$ | $1.83702 \times 10^{-2}$ | $2.74998 \times 10^{-2}$ | $4.55513 \times 10^{-2}$ | $-2.55421 \times 10^{-2}$ | $-6.71793 \times 10^{-2}$ | $-1.06579 \times 10^{-1}$ |
| $A_4$ | $-2.65999 \times 10^{-2}$ | $-7.37360 \times 10^{-3}$ | $-1.89218 \times 10^{-3}$ | $3.96400 \times 10^{-3}$ | $-1.16465 \times 10^{-1}$ | $6.58810 \times 10^{-2}$ |
| $A_5$ | $-9.49948 \times 10^{-3}$ | $-2.55401 \times 10^{-2}$ | $-3.06242 \times 10^{-2}$ | $2.86835 \times 10^{-2}$ | $8.80335 \times 10^{-2}$ | $-5.71827 \times 10^{-2}$ |
| $A_6$ | $7.98815 \times 10^{-3}$ | $-3.75898 \times 10^{-3}$ | $-2.17982 \times 10^{-2}$ | $1.11543 \times 10^{-2}$ | $-4.16444 \times 10^{-2}$ | $2.64303 \times 10^{-2}$ |
| $A_7$ | $-1.14919 \times 10^{-3}$ | $-2.77060 \times 10^{-3}$ | $6.90848 \times 10^{-3}$ | $4.21179 \times 10^{-3}$ | $1.66112 \times 10^{-2}$ | $-3.28908 \times 10^{-2}$ |
| $A_8$ | $-3.39034 \times 10^{-5}$ | $-8.03415 \times 10^{-4}$ | $5.58436 \times 10^{-3}$ | $3.59943 \times 10^{-3}$ | $1.88907 \times 10^{-3}$ | $-4.48093 \times 10^{-4}$ |
| $A_9$ | 0.00000 | 0.00000 | 0.00000 | 0.00000 | $1.24615 \times 10^{-2}$ | $7.61485 \times 10^{-3}$ |
| $A_{10}$ | 0.00000 | 0.00000 | 0.00000 | 0.00000 | $6.54490 \times 10^{-4}$ | $4.94947 \times 10^{-4}$ |

Further, FIG. 23 illustrates aberration diagrams showing various aberrations (spherical aberration, astigmatism, distortion, lateral color, comma aberration) of the wide angle imaging lens according to Example 11.

As shown by Tables 11 and 13 and FIG. 23, according to the wide angle imaging lens of Example 11, |Z5/Z6|=87.96, d8/L=0.195, f/D=0.168, f/f$_2$=−0.843 and f/f$_3$=0.695, and therefore, all of Condition Equations (1), (2), (4), (5) and (6) are satisfied are satisfied, and there is constituted the wide angle imaging lens having a wide angle of an angle of view of 2ω of 145.2° and having a high function capable of excellently correcting respective aberrations.

Example 12

Figure 24:
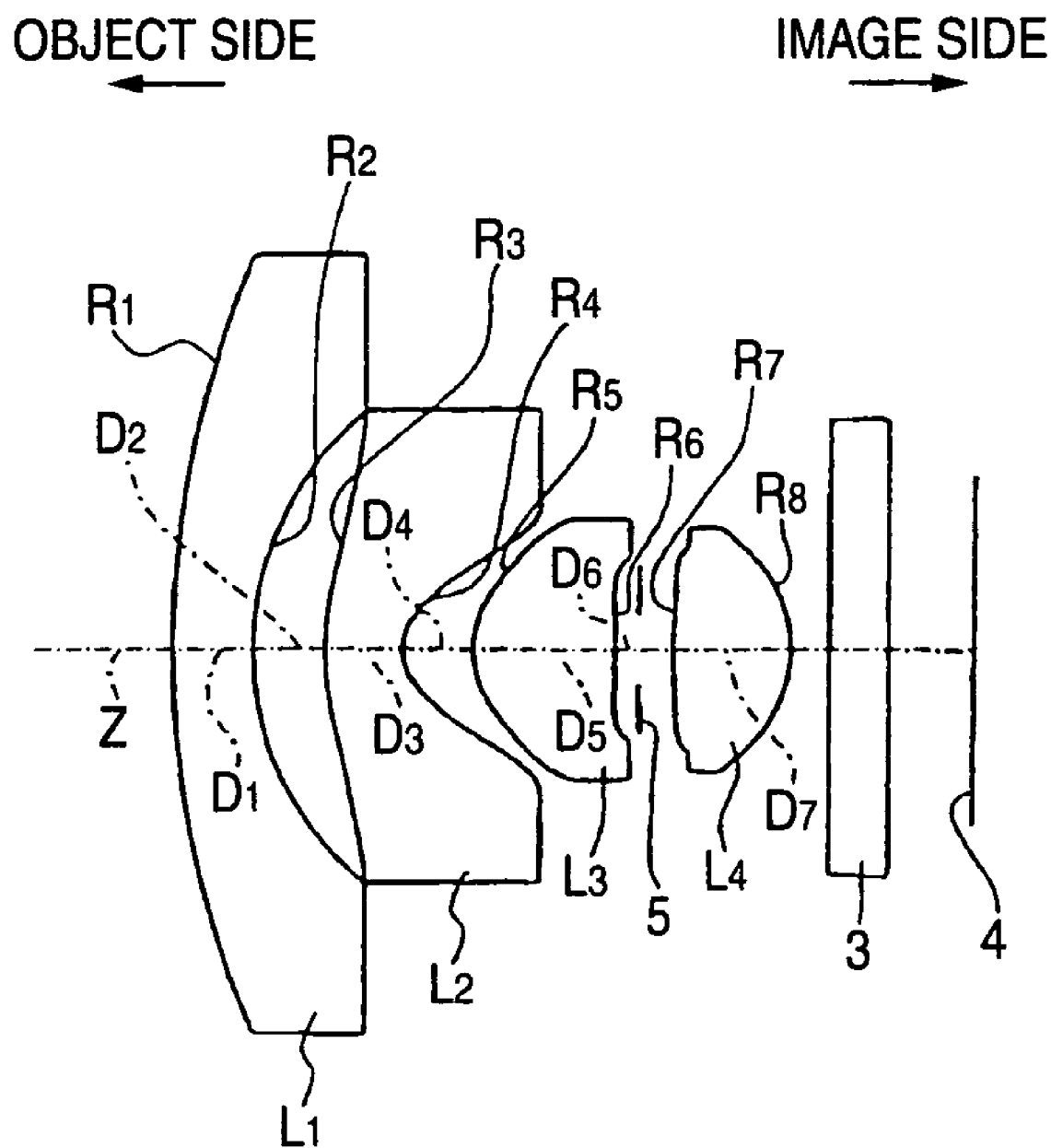
FIG. 24 is a view showing a constitution of a wide angle imaging lens according to Example 12.

A constitution of a wide angle imaging lens according to Example 12 is as shown by FIG. 24.

The constitution of the wide angle imaging lens according to Example 12 is basically similar to that of Example 1.

Specific data are shown with regard to Example 12 as follows.

Further, names of materials of respective lenses shown in an upper stage of Table 12 are the same as those shown in Table 1.

TABLE 12

| surface | R | D | $N_e$ | $\nu_d$ | |
|---|---|---|---|---|---|
| 1 | 13.3821 | 1.00000 | 1.776208 | 49.6 | S-LAH66 |
| 2 | 4.0021 | 0.94734 | | | |
| 3 | 3.8869 | 1.00000 | 1.51081 | 56.0 | ZEONEX |
| 4 | 0.6593 | 0.87479 | | | |
| 5 | 1.3001 | 1.80000 | 1.58820 | 30.3 | PC |
| 6 | −12.3622 | 0.72000 | | | |
| 7 | 3.3511 | 1.50002 | 1.51081 | 56.0 | ZEONEX |
| 8 | −2.0959 | | | | |
| dG | 0.75 | | Z5 | 0.849 | |
| NG | 1.52 | | Z6 | −0.010 | |
| f | 1.45 | | Z5/Z6 | −85.448 | |
| 2ω | 147.7° | | d8 | 2.050 | |
| | | | L | 9.892 | |
| | | | d8/L | 0.207 | |

Aspherical Coefficient

| | surface No. | | | | | |
|---|---|---|---|---|---|---|
| | 3 | 4 | 5 | 6 | 7 | 8 |
| K | $4.54973 \times 10^{-1}$ | $-1.69148 \times 10^{-2}$ | $2.69849 \times 10^{-1}$ | $9.85193 \times 10^{-1}$ | $-2.03522 \times 10^{-1}$ | $-4.58034$ |
| $A_3$ | $2.27939 \times 10^{-2}$ | $2.62903 \times 10^{-2}$ | $4.41621 \times 10^{-2}$ | $-2.07672 \times 10^{-2}$ | $-6.53543 \times 10^{-2}$ | $-1.05003 \times 10^{-1}$ |

TABLE 12-continued

| | | | | | | |
|---|---|---|---|---|---|---|
| $A_4$ | $-2.61712 \times 10^{-2}$ | $-7.32423 \times 10^{-3}$ | $-1.89012 \times 10^{-3}$ | $3.90554 \times 10^{-3}$ | $-1.16258 \times 10^{-1}$ | $6.60946 \times 10^{-2}$ |
| $A_5$ | $-8.02848 \times 10^{-3}$ | $-2.41596 \times 10^{-2}$ | $-3.10141 \times 10^{-2}$ | $2.67994 \times 10^{-2}$ | $8.80973 \times 10^{-2}$ | $-5.69838 \times 10^{-2}$ |
| $A_6$ | $7.72635 \times 10^{-3}$ | $-3.36589 \times 10^{-3}$ | $-2.18343 \times 10^{-2}$ | $1.09733 \times 10^{-2}$ | $-4.17623 \times 10^{-2}$ | $2.65120 \times 10^{-2}$ |
| $A_7$ | $-1.51775 \times 10^{-3}$ | $-1.59327 \times 10^{-3}$ | $7.30678 \times 10^{-3}$ | $4.07455 \times 10^{-3}$ | $1.51737 \times 10^{-2}$ | $-3.33647 \times 10^{-2}$ |
| $A_8$ | $6.25501 \times 10^{-5}$ | $-6.26796 \times 10^{-4}$ | $5.74183 \times 10^{-3}$ | $3.50661 \times 10^{-3}$ | $1.77867 \times 10^{-3}$ | $-5.21187 \times 10^{-4}$ |
| $A_9$ | 0.00000 | 0.00000 | 0.00000 | 0.00000 | $1.18812 \times 10^{-2}$ | $7.65458 \times 10^{-3}$ |
| $A_{10}$ | 0.00000 | 0.00000 | 0.00000 | 0.00000 | $6.47795 \times 10^{-4}$ | $6.71408 \times 10^{-4}$ |

Further, FIG. 25 illustrates aberration diagrams showing various aberrations (spherical aberration, astigmatism, distortion, lateral color, comma aberration) of the wide angle imaging lens according to Example 12.

As shown by Tables 12 and 13 and FIG. 25, according to the wide angle imaging lens of Example 11, $|Z5/Z6|=85.45$, $d8/L=0.207$, $f/D=0.185$, $f/f_2=-0.835$ and $f/f_3=0.690$, and therefore, all of Condition Equations (1), (2), (4), (5) and (6) are satisfied are satisfied, and there is constituted the wide angle imaging lens having a wide angle of an angle of view of $2\omega$ of 145.2° and having a high function capable of excellently correcting respective aberrations.

TABLE 13

| | Condition Eq. (1) $\|Z5/Z6\|$ | Condition Eq. (2) d8/L | Condition Eq. (4) f/D | Condition Eq. (5) $f/f_2$ | Condition Eq. (6) $f/f_3$ | r3/f |
|---|---|---|---|---|---|---|
| Ex. 1 | 25.22 | 0.202 | 0.151 | −0.705 | 0.538 | 3.51 |
| Ex. 2 | 570.45 | 0.203 | 0.138 | −0.572 | 0.432 | 3.64 |
| Ex. 3 | 13.42 | 0.146 | 0.108 | −0.487 | 0.394 | 3.18 |
| Ex. 4 | 28.86 | 0.203 | 0.143 | −0.729 | 0.539 | −5.48 |
| Ex. 5 | 7.62 | 0.209 | 0.147 | −0.691 | 0.465 | 16.93 |
| Ex. 6 | 44.94 | 0.204 | 0.145 | −0.706 | 0.523 | −6.11 |
| Ex. 7 | 5.99 | 0.188 | 0.155 | −0.608 | 0.516 | −10.04 |
| Ex. 8 | 26.27 | 0.221 | 0.137 | −0.633 | 0.438 | −11.87 |
| Ex. 9 | 12.87 | 0.229 | 0.149 | −0.681 | 0.505 | −7.50 |
| Ex. 10 | 10.64 | 0.160 | 0.118 | −0.455 | 0.349 | 3.35 |
| Ex. 11 | 87.96 | 0.195 | 0.168 | −0.843 | 0.695 | 2.65 |
| Ex. 12 | 85.45 | 0.207 | 0.185 | −0.835 | 0.690 | 2.68 |

Further, the wide angle imaging lens of the invention is not limited to those in the examples but other various modes can be changed. For example, one surfaces of respective both surfaces of the second lens $L_2$, the third lens $L_3$ and the fourth lens $L_4$ can be constituted by spherical surfaces.

Further, although in the Examples 1 through 12, the light shielding member 2 shown in FIG. 1 is not illustrated, the light shielding member 2 may pertinently be provided outside of the effective diameter of the surface of the image side of the first lens $L_1$.

Further, the wide angle imaging lens of the invention can be mounted to various optical apparatus of a camera for monitoring, a camera for a portable telephone or the like having an imaging element of CCD, CMOS or the like other than the vehicle mounted camera.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-44472 and JP2006-33797, filed Feb. 21 of 2005 and Feb. 10 or 2006, respectively, the contents of which are incorporated herein by reference.

What is claimed is:

1. A wide angle imaging lens comprising, in order from an object side:
   a first lens of a meniscus lens having a negative refractive power and having a convex surface on the object side;
   a second lens having a negative refractive power and having a concave surface on an image side, at least one of both surfaces of the second lens being aspheric;
   a third lens having a positive refractive power and having a convex surface on the object side, at least one of both surfaces of the third lens being aspheric;
   an aperture diaphragm; and
   a fourth lens having a positive refractive power and having a convex surface on the image side, at least one of both surfaces of the fourth lens being aspheric,
   wherein
   the first lens comprises a material having Abbe number at d line of 40 or more,
   the second lens comprises a material having Abbe number at d line of 50 or more,
   the third lens comprises a material having Abbe number at d line of 40 or less, and
   the fourth lens comprises a material having Abbe number at d line of 50 or more.

2. The wide angle imaging lens according to claim 1, wherein a difference of Abbe number at d line between the material of the second lens and the material of the third lens is 20 or more.

3. The wide angle imaging lens according to claim 1, wherein the both surfaces of the second lens are aspheric, the both surfaces of the third lens are aspheric, and the both surfaces of the fourth lens are aspheric.

4. The wide angle imaging lens according to claim 1, wherein the first lens has an antireflection coat on the image side thereof, the antireflection coat having an optical thickness of 150 nm to 225 nm at a vicinity of an optical axis.

5. The wide angle imaging lens according to claim 1, which satisfies Condition Equation (1):

$$|Z5/Z6|>3 \qquad (1)$$

wherein Z5 represents a difference between first and second coordinates in an optical axis direction, the first coordinate is a coordinate of an apex of a surface on the object side of the third lens, and the second coordinate a coordinate of an intersection of an off-axis outermost light with the surface on the object side of the third lens, the off-axis outermost light passing at an outermost edge of an effective diameter of the wide angle imaging lens; and Z6 represents a difference between third and fourth coordinates in an optical axis direction, the third coordinate is a coordinate of an apex of a surface on the image side of the third lens, and the fourth coordinate is a coordinate of an intersection of the off-axis outermost light with the surface on the image side of the third lens.

6. The wide angle imaging lens according to claim 1, which satisfies Condition Equation (2):

$$0.25 > d8/L > 0.13 \quad (2)$$

wherein L represents a distance from a surface on the object side of the first lens to an imaging surface, d8 represents a distance from a surface on the image side of the fourth lens to the imaging surface, and when other optical member is interposed in an optical path, d8 and L are set to distances calculated by converting an optical thickness in the optical axis direction of the other optical member by an optical thickness of air.

7. The wide angle imaging lens according to claim 1, wherein at least one of the second, third and fourth lenses comprises a material having a water absorption of 0.3% or less.

8. A wide angle imaging lens comprising, in order from an object side:
a first lens of a meniscus lens having a negative refractive power and having a convex surface on the object side;
a second lens having a negative refractive power and having a concave surface on an image side, at least one of both surfaces of the second lens being aspheric;
a third lens having a positive refractive power and having a convex surface on the object side, at least one of both surfaces of the third lens being aspheric;
an aperture diaphragm; and
a fourth lens having a positive refractive power and having a convex surface on the image side, at least one of both surfaces of the fourth lens being aspheric, wherein
the first lens comprises a material having Abbe number at d line of 40 or more, the second lens comprises a material having Abbe number at d line of 50 or more, the third lens comprises a material having Abbe number at d line of 40 or less,
the fourth lens comprises a material having Abbe number at d line of 50 or more, and
the wide angle imaging lens satisfies Condition Equation (4):

$$0.10 < f/D < 0.22 \quad (4)$$

wherein f represents a focal length of the entire system of the wide angle imaging lens, and D represents a distance from a surface on the object side of the first lens to a surface on the image side of the fourth lens.

9. The wide angle imaging lens according to claim 8, which satisfies Condition Equations (5) and (6):

$$-0.9 < f/f_2 < -0.4 \quad (5)$$

$$0.3 < f/f_3 < 0.8 \quad (6)$$

wherein $f_2$ represents a focal length of the second lens, and $f_3$ represents a focal length of the third lens.

10. The wide angle imaging lens according to claim 8, wherein a difference of Abbe number at d line between the material of the second lens and the material of the third lens is 20 or more.

11. The wide angle imaging lens according to claim 8, wherein the both surfaces of the second lens are aspheric, the both surfaces of the third lens are aspheric, and the both surfaces of the fourth lens are aspheric.

12. The wide angle imaging lens according to claim 8, wherein the first lens has an antireflection coat on the image side thereof, the antireflection coat having an optical thickness of 150 nm to 225 nm at a vicinity of an optical axis.

13. The wide angle imaging lens according to claim 8, which satisfies Condition Equation (1):

$$|Z5/Z6| > 3 \quad (1)$$

wherein Z5 represents a difference between first and second coordinates in an optical axis direction, the first coordinate is a coordinate of an apex of a surface on the object side of the third lens, and the second coordinate a coordinate of an intersection of an off-axis outermost light with the surface on the object side of the third lens, the off-axis outermost light passing at an outermost edge of an effective diameter of the wide angle imaging lens; and
Z6 represents a difference between third and fourth coordinates in an optical axis direction, the third coordinate is a coordinate of an apex of a surface on the image side of the third lens, and the fourth coordinate is a coordinate of an intersection of the off-axis outermost light with the surface on the image side of the third lens.

14. The wide angle imaging lens according to claim 8, which satisfies Condition Equation (2):

$$0.25 > d8/L > 0.13 \quad (2)$$

wherein L represents a distance from a surface on the object side of the first lens to an imaging surface, d8 represents a distance from a surface on the image side of the fourth lens to the imaging surface, and when other optical member is interposed in an optical path, d8 and L are set to distances calculated by converting an optical thickness in the optical axis direction of the other optical member by an optical thickness of air.

15. The wide angle imaging lens according to claim 8, wherein at least one of the second, third and fourth lenses comprises a material having a water absorption of 0.3% or less.

* * * * *